United States Patent
Kato et al.

[11] Patent Number: 6,083,642
[45] Date of Patent: Jul. 4, 2000

[54] POSITIVE ELECTRODE MATERIAL FOR ALKALINE STORAGE BATTERY, METHOD OF PRODUCING THE SAME, AND ALKALINE STORAGE BATTERY USING THE SAME

[75] Inventors: Fumio Kato, Kamakura; Futoshi Tanigawa; Yoshitaka Dansui, both of Fujisawa; Kohji Yuasa, Chigasaki, all of Japan

[73] Assignee: Matsushita Electric Industrial Co., Ltd., Osaka-fu, Japan

[21] Appl. No.: 08/991,415

[22] Filed: Dec. 16, 1997

[30] Foreign Application Priority Data

| Dec. 24, 1996 | [JP] | Japan | 8-342993 |
| Jun. 17, 1997 | [JP] | Japan | 9-159430 |
| Jul. 24, 1997 | [JP] | Japan | 9-198127 |
| Oct. 6, 1997 | [JP] | Japan | 9-272341 |

[51] Int. Cl.⁷ .............. H01M 4/52; H01M 4/32; C01G 51/04
[52] U.S. Cl. .......... 429/218.1; 429/223; 429/231.3; 423/594
[58] Field of Search ............. 429/223, 218.1, 429/231.3; 423/594

[56] References Cited

U.S. PATENT DOCUMENTS

| 4,844,948 | 7/1989 | Nakahori et al. ............ 497/126.3 |
| 4,985,318 | 1/1991 | Oshitani et al. ............ 429/223 |
| 5,405,714 | 4/1995 | Terasaka et al. ............ 429/52 |
| 5,523,182 | 6/1996 | Ovshinsky et al. ............ 429/223 |
| 5,629,111 | 5/1997 | Yamawaki et al. ............ 429/223 |
| 5,630,993 | 5/1997 | Amatucci et al. ............ 423/594 |

FOREIGN PATENT DOCUMENTS

| 0 727 835 A1 | 8/1996 | European Pat. Off. . |
| 4-109557 | 4/1992 | Japan . |
| 08148145 | 6/1996 | Japan . |
| 09147905 | 6/1997 | Japan . |

*Primary Examiner*—Maria Nuzzolillo
*Assistant Examiner*—Jonathan Crepeau
*Attorney, Agent, or Firm*—Akin, Gump, Strauss, Hauer & Feld, L.L.P.

[57] ABSTRACT

Disclosed is a positive electrode material which provides an alkaline storage battery having high active material utilization, wherein good capacity recovery can be obtained by charging even after standing in the state of overdischarge or short circuit, and reduction in capacity scarcely arises. This active material comprises nickel hydroxide particles and a cobalt oxide. The cobalt oxide is a higher cobalt oxide containing as a main component γ-cobalt oxyhydroxide, which belongs to any one crystal system of hexagonal, orthorhombic and monoclinic systems and has a layered structure, wherein a lattice spacing of the (003) plane is from 5.5 to 7.0 angstroms and an average valence of cobalt is higher than 3.0. Those which are prepared by coating the surface of nickel hydroxide particles with the higher cobalt oxide are preferable.

18 Claims, 20 Drawing Sheets

POSITIVE ELECTRODE MATERIAL FOR ALKALINE STORAGE BATTERY, METHOD OF PRODUCING THE SAME, AND ALKALINE STORAGE BATTERY USING THE SAME

BACKGROUND OF THE INVENTION

The present invention relates to an alkaline storage battery. More particularly, it relates to an active material of a non-sintered type positive electrode for alkaline storage batteries, which comprises nickel hydroxide particles and a cobalt oxide as a conductive agent, and a method of producing the same.

With the recent popularization of portable equipment, realization of high capacity has been required strongly of an alkaline storage battery. Particularly, a nickel-metal hydride storage battery is a secondary battery comprising a positive electrode using nickel hydroxide as an active material, and a negative electrode using a hydrogen storage alloy as a main material, and has rapidly been popularized as a secondary battery having high capacity and high reliability.

The positive electrode for alkaline storage batteries will be described hereinafter.

The positive electrode for alkaline storage batteries is roughly classified into two types, e.g. sintered type and non-sintered type. The former is produced by impregnating a porous nickel sintered plaque having a porosity of about 80%, obtained by sintering a core material (e.g. perforated metal sheet, etc.) and a nickel powder, with an aqueous solution of a nickel salt (e.g. nickel nitrate, etc.), followed by impregnating with an alkaline solution, thereby to form nickel hydroxide in the porous nickel sintered plaque. Regarding this positive electrode, it is difficult to make the porosity of the plaque larger than that of a conventional positive electrode and, therefore, an amount of the active material to be filled cannot be increased, which results in a limit of high capacity.

The latter non-sintered type positive electrode is produced, for example, by filling a three-dimensionally continuous porous foamed nickel substrate having a porosity of not less than 95% with nickel hydroxide particles as disclosed in Japanese Laid-Open Patent Sho 50-36935, and is widely used as a positive electrode for high-capacity alkaline storage batteries. As an active material for the non-sintered type positive electrode, spherical nickel hydroxide particles having high bulk density are used in view of realization of high capacity. As the nickel hydroxide particles, a solid solution material incorporated with one or more metallic element other than nickel (e.g. cobalt, cadmium, zinc, etc.) is generally used in view of the improvement of discharge characteristic, charge acceptance and cycle life.

Regarding the porous foamed substrate used in the non-sintered type positive electrode, the pore size is from about 200 to 500 $\mu$m and these pores are filled with spherical nickel hydroxide particles having a particle diameter of several $\mu$m to several tens $\mu$m. The charge/discharge reaction of the nickel hydroxide particles, which are present in the vicinity of a skeleton of the substrate where current collection is satisfactorily performed, proceeds smoothly, but the reaction of the nickel hydroxide particles which are present apart from the skeleton does not proceed sufficiently. Accordingly, in the non-sintered positive electrode, means for electrically connecting nickel hydroxide particles by using a conductive agent are employed so as to improve the utilization of the filled nickel hydroxide particles.

As the conductive agent, a single metal such as cobalt, nickel, etc. is used sometimes, but a divalent cobalt oxide such as cobalt hydroxide, cobalt monoxide, etc. is exclusively used. These divalent cobalt oxides have no conductivity, intrinsically. It is considered, however, that these divalent cobalt oxides are electrochemically oxidized by initial charging in the battery to be converted into $\beta$-cobalt oxyhydroxide having conductivity, which effectively serves as a conductive network. By the presence of this conductive network, it becomes possible to largely enhance the utilization of the active material filled in high density in the non-sintered type positive electrode, thereby to realize high capacity compared with the sintered type positive electrode.

However, even in the non-sintered positive electrode having the above described construction, the conductive performance of the network is not perfect and there is a limit in utilization of the nickel hydroxide particles. This is because divalent cobalt oxide cannot be completely converted into $\beta$-cobalt oxyhydroxide by the above described electrochemical oxidation reaction. Referring to the case where cobalt hydroxide is used as the conductive agent, the cobalt hydroxide synthesized by adding an aqueous alkaline solution to an aqueous solution of a divalent cobalt salt (e.g. cobalt sulfate, cobalt nitrate, cobalt chloride, etc.) has generally high crystallinity, although it depends on the pH and temperature of the solution on synthesis. This cobalt hydroxide dissolves in a strong alkaline electrolyte in the battery to form a cobalt complex ion ($HCoO_2^-$), which is then oxidized by initial charging to be convert into $\beta$-cobalt oxyhydroxide. However, since the concentration of this complex ion formed in the electrolyte is very small, most of the cobalt hydroxide added in the positive electrode is oxidized by the solid phase reaction, not the reaction via the cobalt complex ion. At this time, since the number of reaction sites for oxidation (reaction of drawing electrons and protons from cobalt hydroxide) is small in the cobalt hydroxide of high crystallinity as described above, the oxidation does not proceed sufficiently to inside of the crystal. Accordingly, although it varies depending the conditions of the initial charging, a large amount of unreacted cobalt hydroxide having no conductivity inside the crystal generally remains and the conductive performance of the network becomes imperfect and, therefore, a limit in positive electrode utilization arises.

The above positive electrode has a drawback that, when a battery is overdischarged or allowed to stand in the state of short circuit, or stored for a long period of time or stored under high temperature, the positive electrode capacity is reduced. Under such conditions, since the positive electrode potential is maintained at a level lower than that of a normal state of the completion of discharge, more deep discharge (reduction) of the nickel hydroxide particles proceeds and, at the same time, the reduction of the cobalt oxide containing $\beta$-cobalt oxyhydroxide forming the conductive network proceeds. In this case, since the conductive performance of the network is imperfect, the active material in the position apart from the substrate skeleton remains without being discharged and the reduction proceeds, intensively, only in the vicinity of the substrate skeleton where current collection is sufficiently performed. Then, the cobalt oxide in the vicinity of the skeleton is completely reduced to a divalent oxide, which is eluted in the electrolyte as a cobalt complex ion and is diffused to the active material portion in the position apart from the nickel substrate skeleton. In the nickel-metal hydride storage battery using a hydrogen storage alloy as the negative electrode, since the interior of the battery is maintained at a strong reducing atmosphere of hydrogen, the reduction/dissolution reaction of cobalt proceeds acceleratively and there also arises such a phenomenon that the eluted cobalt complex ion is deposited at the negative electrode side as a metallic cobalt. This deposited metallic cobalt does not return to the positive electrode again. Therefore, in the above positive electrode, the conductive network is destroyed and the capacity is reduced.

Recently, several means for improving the imperfection of the above positive electrode network have been reported.

First, as an approach of increasing the oxidation degree of the divalent cobalt oxide, thereby to improve the above imperfection, Japanese Laid-Open Patent Hei 8-148145 (or U.S. Pat. No. 5,629,111) discloses a technique of oxidizing cobalt hydroxide in a positive electrode material by heating in the presence of an aqueous alkaline solution and oxygen (air), thereby to convert into a cobalt oxide having a distorted crystal structure and a cobalt valence higher than 2. The same patent publication discloses oxidation to a cobalt oxide having a valence of about 2.9 and characteristics of a battery using the same. As the contents similar to those described above, Japanese Laid-Open Patent Hei 9-147905 discloses an improvement in cobalt oxide with a cobalt valence of 2.5 to 2.93.

On the other hand, Japanese Laid-Open Patent Hei 8-148146 discloses that nickel hydroxide particles having a coating layer of a cobalt hydroxide (hereinafter referred to as $Co(OH)_2$-coated nickel hydroxide particles) are subjected to the above heating treatment. The $Co(OH)_2$-coated nickel hydroxide particles are prepared by using a method of stirring nickel hydroxide particles in an aqueous solution of a divalent cobalt salt and adjusting the pH while adding dropwise an aqueous alkaline solution, thereby to deposit a cobalt hydroxide on the surface of the particles, or a method of adding a cobalt hydroxide powder to nickel hydroxide particles and coating the surface of the nickel hydroxide particles with the cobalt hydroxide utilizing an action of a shear force or an impact force due to mechanical mixing (mechanical mixing method); these methods have been known for a long time as means for enhancing the dispersibility of the cobalt compound in the positive electrode. When such $Co(OH)_2$-coated nickel hydroxide particles are subjected to the above heating treatment, there can be obtained a positive electrode material capable of providing a considerably better conductive network by the combination of high dispersibility of the cobalt compound and bonding of the interface between the nickel hydroxide particles and the coating layer upon treatment even if the amount of cobalt used is small.

As the method for production of the above positive electrode material, Japanese Laid-Open Patent Hei 9-73900 discloses a method of flowing $Co(OH)_2$-coated nickel hydroxide particles containing an aqueous alkaline solution in a batch fluidized drier, or heating the particles with dispersing. According to this method, there is an advantage that agglomeration of particles due to treatment can be prevented.

However, proceeding of the oxidation of the cobalt hydroxide varies largely depending on the concentration of an alkaline component which is present around the cobalt hydroxide, the delicate wetting state of the particles, the temperature of the particles upon treatment, the humidity and oxygen concentration of the environment, and the complicated reaction path that exists. Accordingly, it is quite difficult to completely inhibit the phenomenon that the cobalt hydroxide is not sufficiently oxidized or byproducts are formed. Therefore, the average cobalt valence of the cobalt oxide in the above described patent publications was substantially lower than 3.0 (about 2.9). In the interior of the actual battery, there is a possibility that the cobalt valence becomes higher than the above value because of the oxidation during initial charging of the battery, but such an oxide is inferior in electronic conductivity to a cobalt oxide whose valence exceeds 3.0 before the construction of the battery. Accordingly, the conductive network of the positive electrode using the same is not satisfactory and there still exists some room for improvement.

SUMMARY OF THE INVENTION

An object of the present invention is to solve the above conventional disadvantages and to provide a positive electrode material for alkaline storage batteries having improved utilization.

Another object of the present invention is to provide a positive electrode material which can provide an alkaline storage battery having high active material utilization and improved overdischarge withstanding characteristics.

The present invention has been accomplished based on a success in obtaining a higher cobalt oxide comprising γ-cobalt oxyhydroxide whose average cobalt valence is higher than 3.0 as a main component.

This γ-cobalt oxyhydroxide belongs to any one crystal system of hexagonal, orthorhombic and monoclinic systems and has a layered structure, wherein a lattice spacing of the (003) plane is from 5.5 to 7.0 angstroms and an average valence of cobalt is higher than 3.0.

The γ-cobalt oxyhydroxide preferably contains at least one of $K^+$ and $Na^+$ in the crystal.

The present invention provides a positive electrode material for alkaline storage batteries, comprising a higher cobalt oxide containing γ-cobalt oxyhydroxide as a main component, and nickel hydroxide particles.

As the nickel hydroxide particles, a solid solution material with one or more metallic element other than nickel (e.g. cobalt, cadmium, zinc, etc.) incorporated therein is preferable for improvement of discharge characteristic, charge acceptance and life cycle.

The present invention also provides a method for producing a positive electrode material for alkaline storage batteries, comprising:

a first step of adding dropwise an aqueous alkaline solution while mixing nickel hydroxide particles having a coating layer of cobalt hydroxide in a container equipped with microwave heating means and mixing/stirring means, thereby to form wet particles whose surface is wetted with the aqueous alkaline solution;

a second step of mixing continuously with heating the wet particles by microwave irradiation in the airtight container, thereby to heat the wet particles to a predetermined temperature; and a third step of releasing airtight state of the container to introduce air into the container after reaching the predetermined temperature and mixing continuously under controlled output of the microwave so that a temperature of the particles becomes constant, thereby to completely dry the wet particles.

It is preferable that the inner wall portion of the container is provided with heating means and the inner wall of the container is heated supplementally with the heating means from the first step through the third step.

It is preferable that the solid solution nickel hydroxide particles having the coating layer of the cobalt oxide have an average particle diameter of 5 to 20 μm, the coating layer has a thickness of not more than 0.2 μm, most of the surface of the particles is coated with the coating layer and, furthermore, the particles have a BET specific surface area of 5 to 12 m²/g.

It is preferable that the heating temperature in the second and third steps is from 90 to 130° C.

According to the present invention, there can be produced a non-sintered type positive electrode for alkaline storage batteries, which has a conductive network based on high conductivity of γ-cobalt oxyhydroxide. Accordingly, in accordance with the present invention, there can be provided an alkaline storage battery capable of maintaining high capacity even after standing in the state of overdischarge or short circuit, long-term storage, or high-temperature storage, simultaneously with accomplishing extremely high positive electrode utilization.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
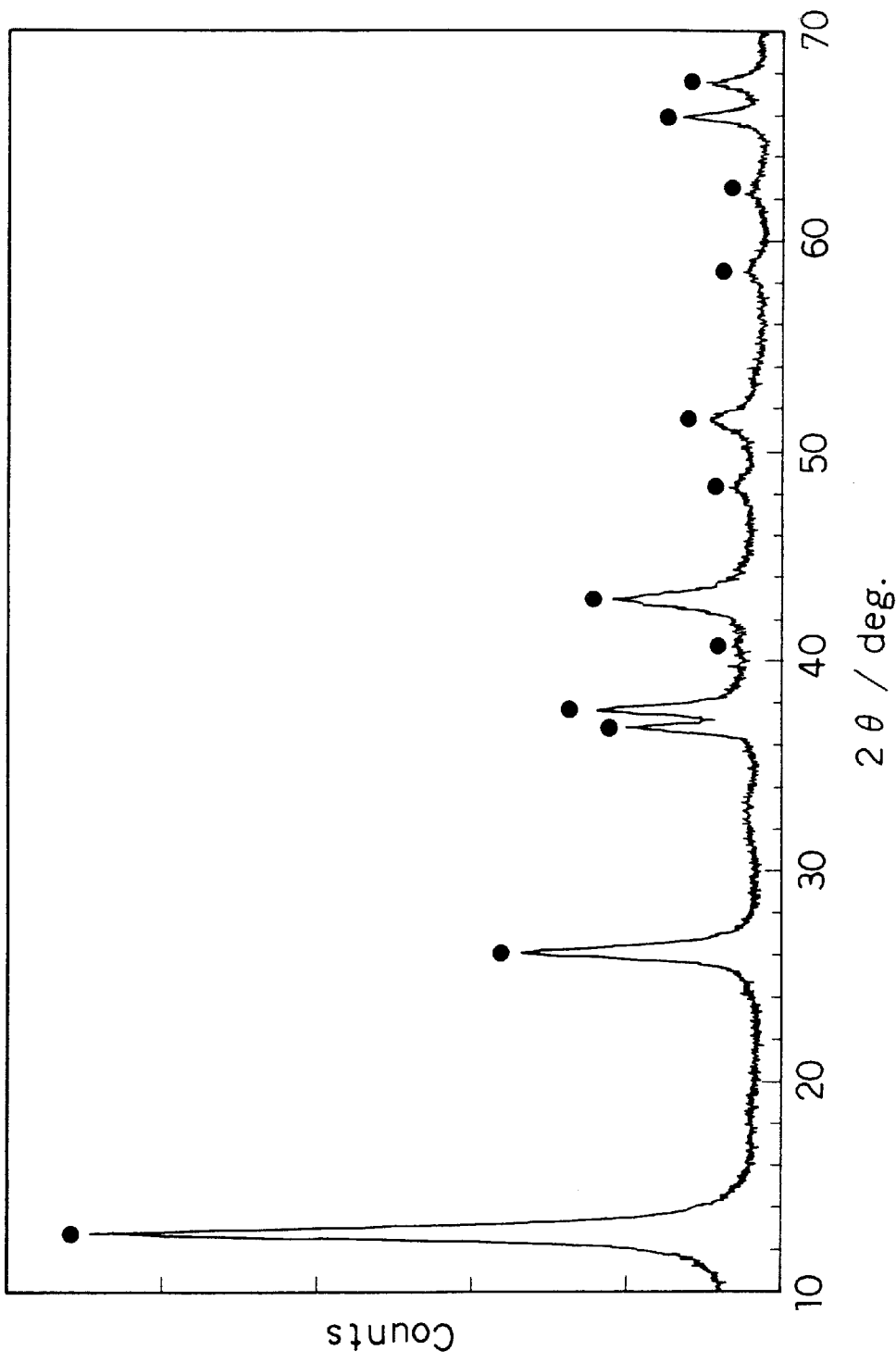
FIG. 1 is a graph showing an X-ray diffraction pattern of a higher cobalt oxide x obtained in the Example of the present invention.

The positive electrode material for alkaline storage batteries in accordance with the present invention comprises nickel hydroxide particles, and a cobalt oxide for preferably coating the surface of the nickel hydroxide particles. This cobalt oxide comprises γ-cobalt oxyhydroxide, which belongs to any one crystal system of hexagonal, orthorhombic and monoclinic systems and has a layered structure, wherein a lattice spacing of the (003) plane is from 5.5 to 7.0 angstroms and an average valence of cobalt is higher than 3.0.

The γ-cobalt oxyhydroxide is a higher oxide obtained by vigorously oxidizing a divalent cobalt hydroxide in the presence of KOH or NaOH, water and air (oxygen). Since the γ-cobalt oxyhydroxide is superior in conductive performance to a cobalt oxide (mainly a mixture of β-cobalt oxyhydroxide and a divalent cobalt oxide) obtained by an electrochemical oxidation reaction in a conventional battery and a cobalt oxide having a valence of about 2.9 (almost the same as β-cobalt oxyhydroxide in view of its crystal structure) obtained by known air oxidation in the presence of alkali, the utilization of nickel hydroxide can be improved.

Furthermore, γ-cobalt oxyhydroxide can maintain electric conduction between the substrate skeleton and a large amount of nickel hydroxide during overdischarge or storage under short circuit because of its high conductivity and, therefore, it delays proceeding of the intensive reduction in the vicinity of the substrate skeleton described above. In addition, since γ-cobalt oxyhydroxide itself has been oxidized to an extremely high state and its reduction potential in the alkaline electrolyte is low compared with β-cobalt oxyhydroxide, it is not easily reduced to the state of the valence of 2.0 (state where cobalt can dissolve in the electrolyte).

By the above reason, deterioration of the positive electrode capacity during overdischarge or storage under short circuit can be further inhibited.

In a preferred mode of the present invention, β-cobalt oxyhydroxide contains at least one of $K^+$ and $Na^+$ in the crystal.

An atomic ratio of $K^+$ and/or $Na^+$ contained in the γ-cobalt oxyhydroxide to cobalt is preferably within a range from 0.20 to 0.33.

The γ-cobalt oxyhydroxide includes two types, e.g. a type containing $K^+$ and a type containing $Na^+$ (basic crystal structures are the same) and a molar ratio of M/Co (M is K or Na) is assumed to be 0.33 according to an ideal structural formula. Since an oxide corresponding to the ideal structure is rarely obtained, M/Co is substantially within the above range.

A weight ratio of the higher cobalt oxide comprising γ-cobalt oxyhydroxide to the nickel hydroxide particles is preferably within a range from 0.02 to 0.10. When the amount of the higher oxide is smaller than the above range, the electric conduction between the nickel hydroxide particles and the substrate skeleton cannot be maintained satisfactory. On the other hand, when the amount of the higher oxide is too large, an amount of the nickel hydroxide is relatively reduced and, therefore, a positive electrode having high energy density cannot be prepared.

It is preferable that the nickel hydroxide particles having the coating layer of the cobalt oxide have an average particle diameter of 5 to 20 $\mu$m, the coating layer has a thickness of not more than 0.2 $\mu$m, and most of the surface of the particles is coated with the coating layer. When the average particle diameter of the nickel hydroxide particles deviates from the above range, the energy density of the positive electrode is reduced because of a reduction in bulk density. When the thickness of the coating layer exceeds 0.2 $\mu$m, the amount of the cobalt oxide in the whole active material is too large and the amount of the nickel hydroxide is relatively reduced and, therefore, the energy density of the positive electrode is reduced, too. Since the average particle diameter and the thickness of the coating layer are within the above range and, at the same time, the ability of current collection from the nickel hydroxide becomes maximum, those particles which are completely coated with the coating layer are most preferable as active material particles.

In another aspect of the present invention, regarding the nickel hydroxide particles having the coating layer of the cobalt oxide, a spectral reflectance at visible region (wavelength of 400 to 700 nm) as measured by a diffuse reflection method is not less than 3.5%, a maximum value having the spectral reflectance of not less than 4.0% is present at a wavelength of about 450 nm (indigo), and a cobalt average valence of the coating layer is higher than 3.0. The color of the active material particles is closely related to the electronic state of the cobalt oxide constituting the coating layer, and the cobalt oxide having the above color has high electronic conductivity. This is because the above color reflects an electronic state having a valence higher than 3.0, which is peculiar to $\gamma$-cobalt oxyhydroxide (presence of tetravalent cobalt species).

The method of producing the positive electrode material for alkaline storage batteries comprises a first step of adding dropwise an aqueous alkaline solution while mixing nickel hydroxide particles having a coating layer of cobalt hydroxide in a container equipped with microwave heating means and mixing/stirring means, thereby to form wet particles whose surface is wetted with the aqueous alkaline solution; a second step of mixing continuously with heating the wet particles by microwave irradiation in the airtight container, thereby to heat the wet particles to a predetermined temperature; and a third step of introducing air into the container after reaching the predetermined temperature and mixing continuously with controlling an output of the microwave so that a temperature of the particles becomes constant, thereby to completely dry the wet particles.

When the Co(OH)$_2$-coated nickel hydroxide particles are oxidized in the presence of the aqueous alkaline solution, the following two processes are considered in the reaction mechanism of the cobalt hydroxide constituting the coating layer.

In the first process, the cobalt hydroxide dissolves in an aqueous alkaline solution, which is present on the surface of the coating layer, as a cobalt complex ion (HCoO$_2^-$) according to the reaction of formula (1), and then the cobalt complex ion is oxidized by contacting with oxygen according to the reaction of formula (2), thereby to deposit a higher cobalt oxide on the particles.

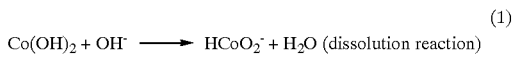

In the second process, a cobalt hydroxide is oxidized in an atmosphere wherein an alkaline solution and oxygen are present, with forming water like a solid phase reaction as shown in formula (3), that is, without dissolution, thereby to form a higher cobalt oxide. Formula (4) shows consumption of oxygen in this atmosphere.

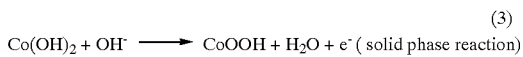

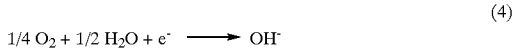

In the above formulas, the product was represented by CoOOH (apparent valence of cobalt is 3.0) for abbreviation, but it is possible to oxidize to form $\gamma$-cobalt oxyhydroxide having a cobalt valence higher than 3.0 by satisfactorily controlling the reaction. In this case, the outline of the reaction is the same but the reaction formula becomes more complicated.

Considering the above two processes in detail, the proceeding of the first process depends on the solubility of the cobalt hydroxide in the aqueous alkaline solution (formula 1). However, in case of an aqueous KOH solution having a concentration of 30% by weight at 60° C., the solubility is merely several hundreds ppm and the dissolution rate is not so large. Accordingly, it is necessary to control the atmosphere to high temperature in order to increase the reaction rate. But, when the solution is evaporated because of too small humidity of the atmosphere to dryness, after controlling to high temperature, it becomes impossible to form the complex ion of formula (1) and the reaction is terminated. On the other hand, in the oxidation reaction of formula (2), it is important that the formed cobalt complex ion is sufficiently contacted with oxygen (air). When the temperature becomes high in the atmosphere which lacks in environmental oxygen, Co$_3$O$_4$ (Co valence: 2.67) having poor conductivity is formed by the secondary reaction of the following formula:

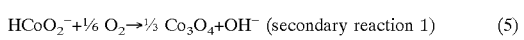

In the second process, when the cobalt hydroxide is heated in the presence of an alkaline solution, a higher cobalt oxide is formed by the reaction of formula (3). At this time, the reaction of formula (4) occurs, simultaneously, in the presence of oxygen and the reaction of formula (3) proceeds continuously. In order to allow this reaction to proceed smoothly, for example, high temperature of the reaction system, increase in OH$^-$ concentration (formula 3), increase in O$_2$ concentration (formula 4) and appropriate removal of formed water from the reaction system are important. When water is excessively removed, that is, drying is excessively performed, it becomes impossible to form an OH$^-$ ion from alkaline species and, therefore, the reaction of formula (3) is terminated. To the contrary, when water is not removed sufficiently, the O$_2$ concentration in the vicinity of the cobalt hydroxide is relatively reduced and, therefore, the reaction of formula (4) does not proceeds sufficiently, which results in the secondary reaction of formula (6) in place of formula (3).

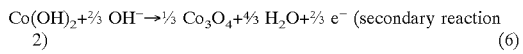
(6)

As described above, it is apparent that the state of water and oxygen (air) on treatment plays an important role in any process.

In view of the above points, in order to proceed the oxidation reaction of the $Co(OH)_2$-coated particles efficiently in the presence of an alkaline material, it is important to perform the treatment by controlling well the amounts of water and oxygen under a high temperature condition for the particles, which are in funicular state (by the classification of particle states used in chemical engineering, this is classified as a wetted state where a liquid is present sufficiently on the surface of a particle but contact with air of the particle is secured).

Therefore, according to the present invention, in the first step, $Co(OH)_2$-coated nickel hydroxide particles are first converted into wet particles in uniform funicular state by adding dropwise an aqueous alkaline solution while mixing. The microwave heating in the following second and third steps is a technique of irradiating microwaves to the wet particles, thereby to apply vibration in a molecular level to a dielectric substance (aqueous alkaline solution in this case) and heating by collision/friction heat of molecules. In the second step, the wet particles can be heated rapidly to a predetermined temperature without causing unevenness of heat by performing microwave heating while mixing under an airtight atmosphere.

Introduction of air after release of the airtight state in the following third step is performed for the purpose of efficiently discharging excess water formed by the oxidation reaction of the cobalt hydroxide out of the system and feeding oxygen in a required enough amount to the reaction system. In this case, latent heat is lost by evaporation of excess water but heat is applied by microwave heating while monitoring the particle temperature and the temperature in the system is maintained within a predetermined range.

When microwave irradiation is used as heating means for proceeding the oxidation, the oxidation efficiency of the coating layer is higher compared with other heating means, because microwave permits strong and selective heating of the portion of the cobalt coating layer wetted with the alkaline aqueous solution, causing complete oxidation of the cobalt in the coating layer to the extent where the valence exceeds 3.0. The reason why the wet particles are completely dried is as follows. That is, an end point of the oxidation reaction cannot be easily distinguished and there is a possibility that the oxidation further proceeds while water is present on the surface of the particles. It can be said that the treatment has been completed after the particles are completely dried.

It is preferable that the inner wall of the container is provided with heating means and the inner wall of the container is heated supplementally with the heating means from the first step through the third step. Such heating is extremely effective to prevent dew condensation of evaporated water or alkaline mist on the inner wall of the container and adhesion of the particles thereon or agglomeration or solidification of the particles.

It is preferable the $Co(OH)_2$-coated nickel hydroxide particles have an average particle diameter of 5 to 20 μm, most of the surface of the particles is coated with the coating layer and the coating layer has a thickness of not more than 0.2 μm, and furthermore, the particles have a BET specific surface area of 5 to 12 m²/g. When the average particle diameter is not within the above range, the energy density of the positive electrode is not increased because of a reduction in bulk density of the particles. When the thickness of the coating layer is too large, the amount of the nickel hydroxide having an influence on the positive electrode capacity is relatively reduced and it becomes impossible to provide a positive electrode having high energy density, too. In order to facilitate current collection from the nickel hydroxide mother particles, the coating layer is in the state where all particles are coated, most preferably. Furthermore, when the BET specific surface area is too large or too small, the wetting properties of the particles vary largely and, therefore, it becomes difficult to lead the particles to the funicular state by using a predetermined aqueous alkaline solution during treatment. From this point of view, the BET specific surface area of the $Co(OH)_2$-coated nickel hydroxide particles is preferably within the above range.

It is preferable that the heating temperature in the second and third steps is from 90 to 130° C. in the method of producing of the active material of the present invention. The rate of the oxidation reaction varies largely depending on the temperature and, when the temperature is less than 90° C., proceeding of the reaction is slow and it takes several times per one batch. At the same time, adhesion of the particles on the inner wall of the container is liable to arise, unfavorably. On the other hand, when the temperature exceeds 130° C., the reaction occurs too vigorously and the nickel hydroxide of the inner wall of the coating layer is damaged. From the above point of view, the heating temperature is preferably set within the range from 90 to 130° C.

It is preferable that the aqueous alkaline solution is an aqueous solution of KOH or NaOH, the concentration of the solution is larger than 40% by weight, and an amount of the solution added dropwise is controlled so that a weight ratio of an alkaline solute to the dry weight of the $Co(OH)_2$-coated nickel hydroxide particles is from 0.04 to 0.06.

Since the oxidation reaction in the method of the present invention occurs at about the boiling point of the aqueous alkaline solution, the evaporation rate of water in the aqueous alkaline solution is large. In the first process of this oxidation reaction, cobalt hydroxide dissolves in an aqueous alkaline solution to form a cobalt complex ion, and then this complex ion reacts with oxygen, thereby to form a higher cobalt oxide. Accordingly, during treatment, a predetermined amount of the aqueous alkaline solution must be present on the surface of the particles under high temperature. In other words, even in high temperature (90 to 130° C.), the reaction can not be allowed to proceed sufficiently when the evaporation rate of the aqueous alkaline solution is fast. From this point of view, as the concentration of the aqueous alkaline solution becomes higher, the boiling point increases and the evaporation rate becomes smaller. Therefore, it can be said to be suitable for the treatment. Also, in the second oxidation process, the higher the OH⁻ concentration as apparent from formula (3), the more the oxidation proceeds. Therefore, the higher the concentration of the aqueous alkaline solution, the better. As described above, an aqueous alkaline solution having a concentration of larger than 40% by weight is suitable.

The reason why the amount of the aqueous alkaline solution added dropwise is set within the above range is as follows. That is, the above amount is most suitable for leading the wet particles to a suitable funicular state and, at the same time, agglomeration of the particles can be inhibited as much as possible. The agglomeration of the particles occurs as follows. That is, an alkaline solute reacts with carbon dioxide in air during the treatment, thereby to form a carbonate, which serves as a binder in the drying process of the particles. When the amount of the aqueous alkaline solution added dropwise is too small, the oxidation reaction proceeds insufficiently by and the unreacted content is remains. On the other hand, when the amount is too large, the agglomeration of the particles becomes severe and it is impossible to smoothly perform the treatment.

The Examples of the present invention will be described in detail hereinafter based on the test results.

EXAMPLE 1

1. Preparation of higher cobalt oxide

An aqueous cobalt sulfate solution (1 mol/l) was slowly added to an aqueous sodium hydroxide solution, and then the mixed solution was stirred to adjust the pH of the aqueous solution at 35° C. at 12, thereby to deposit a cobalt hydroxide. The obtained cobalt hydroxide was washed with water and then vacuum-dried to form a cobalt hydroxide standard sample. It was confirmed by the measurement of X-ray diffraction that this cobalt hydroxide standard sample has a β-type crystal structure [JCPDS (Joint Committee on Diffraction Standards), Filing No. of inorganic material: 30-443]. It was confirmed by observation using a scanning electron microscope (SEM) that the sample comprises hexagonal plate-like particles having a particle size of about 0.2 $\mu$m. Furthermore, it was confirmed by the BET method that the sample has a specific surface area of 25 $m^2/g$.

Then, a particulate high-purity potassium hydroxide reagent was ground in a dry atmosphere (in a dry box) and a sufficient amount of the reagent was mixed with the cobalt hydroxide standard sample. The mixed sample was removed from the dry box and charged in a container heated to 110° C., and then air was introduced into the container. In this process, the mixed sample becomes a funicular state where a small amount of water in air is contained because of deliquescence of potassium hydroxide, and the oxidation proceeds. The sample was maintained in the heated container for 12 hours and the oxidation reaction was completed. The sample was removed from the container, washed sufficiently with water and then dried at 80° C. over 3 hours to obtain a higher cobalt oxide x of the present invention. According to the same manner as that described above except for using a particulate high-purity sodium hydroxide reagent in place of the potassium hydroxide reagent, a higher cobalt oxide y of the present invention was prepared.

2. Preparation of positive electrode

Nickel hydroxide particles as mother particles of a positive electrode were synthesized by using the following known technique. That is, an aqueous solution containing nickel sulfate as a main component and cobalt sulfate and zinc sulfate, which are contained in an amount that a molar ratio of cobalt and zinc to nickel is 0.02 and 0.05, respectively, was prepared. To this aqueous solution, an aqueous sodium hydroxide solution was slowly added dropwise while adjusting the pH of the solution with an aqueous ammonia, thereby to deposit spherical solid solution nickel hydroxide particles. The solid solution nickel hydroxide particles with Co and Zn incorporated therein thus prepared were washed with water and then dried to obtain positive electrode mother particles. The solid solution nickel hydroxide particles had a bulk density of about 2.0 g/cc and an average particle diameter of 10 $\mu$m.

To 100 parts by weight of the solid solution nickel hydroxide particles thus obtained, 7.0 parts by weight of the above higher cobalt oxide x and a suitable amount of water were added, followed by mixing and dispersing, thereby to obtain an active material slurry. A porous foamed nickel substrate having a porosity of 95% and a thickness of 1.3 mm was filled with this active material slurry and then dried in a drier at 80° C. The substrate was pressed by rolls to a thickness of 0.7 mm. The resultant sheet was cut into pieces having a predetermined size, thereby to obtain a nickel positive electrode corresponding to the higher cobalt oxide x.

With respect to the higher cobalt oxide y, a corresponding nickel positive electrode was prepared according to the same manner as that described above. Furthermore, to 100 parts by weight of the solid solution nickel hydroxide particles, 7.0 parts by weight of the above cobalt hydroxide standard sample and pure water were added, followed by mixing and dispersing, thereby to form an active material slurry. Then, according to the same manner as that described above, a nickel positive electrode as the Comparative Example was prepared.

3. Preparation of battery and evaluation of positive electrode

Three kinds of nickel positive electrodes thus prepared were combined with a negative electrode of a hydrogen storage alloy, a separator of a hydrophilized polypropylene non-woven fabric, and an electrolyte prepared by dissolving 40 g/l of $LiOH.H_2O$ in an aqueous solution of potassium hydroxide (31% by weight), thereby to produce a nickel-metal hydride storage battery (⅘ A size, nominal capacity of 1600 mAh), respectively. The respective batteries were tested by the method described in the following items (1) and (2), and the utilization of the respective nickel positive electrodes and capacity recovery after storage under short circuit were evaluated.

(1) Utilization

A cycle of charging each of the above three kinds of batteries at a charge rate of 0.1 C for 15 hours and then discharging at a discharge rate of 0.2 C until a voltage of the battery is reduced to 1.0 V was repeated (five cycles) and a capacity at the fifth cycle was measured. The capacity of the battery thus measured was divided by a theoretical capacity of the positive electrode (value obtained by multiplying the weight of the nickel hydroxide filled in the positive electrode by the electric capacity 289 mAh/g obtained assuming that the charge/discharge reaction of nickel hydroxide occurs with the excharge of one electron), thereby to calculate the utilization of each nickel positive electrode.

(2) Capacity recovery rate after storage under short circuit.

After the evaluation of the item (1) was completed, a cycle of charging each battery at a charge rate of 1 C for 1.2 hours and then discharging at a discharge rate of 1 C until a voltage of the battery was reduced to 1.0 V was repeated (five cycles) and a capacity at the fifth cycle was measured. This battery was short-circuited using an electric resistance of 1 Ω and was then allowed to stand as it was under the atmosphere at 45° C. for two weeks. Then, a cycle of charging each battery at a charge rate of 1 C for 1.2 hours again and then discharging at a discharge rate of 1 C until a voltage of the battery is reduced to 1.0 V was repeated (five cycles) and a capacity at the fifth cycle was measured. According to the above measurement results, by dividing the value of the capacity of the battery after storage under short circuit by the capacity of the battery before storage under short circuit, the capacity recovery after storage under short circuit in each nickel positive electrode was calculated.

The evaluation results of the respective batteries are shown in Table 1 according to the positive electrode additives.

TABLE 1

| Kind of positive electrode additive | Utilization [%] | Capacity recovery after storage under short circuit [%] |
| --- | --- | --- |
| Cobalt oxide x | 99.2 | 98.8 |
| Cobalt oxide y | 99.4 | 98.6 |
| Cobalt hydroxide | 81.8 | 75.5 |

As is apparent from Table 1, the positive electrodes using the higher cobalt oxides x, y of the present invention showed remarkably high utilization and capacity recovery compared with the positive electrode using the cobalt hydroxide standard sample of the Comparative Example. In order to make these causes clear, the above cobalt oxides x, y were analyzed in detail.

4. Analysis of higher cobalt oxide 4.1. Higher cobalt oxide x 4.1.1. Analysis of crystal structure, valence and composition A graph showing an X-ray diffraction pattern of the higher cobalt oxide x of the present invention is shown in FIG. 1. As an X-ray source, K$\alpha$ ray of Cu was used. As shown by a mark (black circle) in FIG. 1, twelve peaks are confirmed at a diffraction angle 2θ within the range from 10 degrees to 70 degrees. Therefore, the qualitative analysis of the compounds corresponding to these peak positions were carried out by retrieval from the JCPDS inorganic material file. As a result, it has been found that no corresponding one is found among those registered as oxides of cobalt, but they agree well with the diffraction pattern of γ-nickel oxyhydroxide (File No.: 6-75) known as the higher oxide of nickel. The γ-nickel oxyhydroxide is, according to a known literature, e.g. P. Oliva et al., J. Power Sources, 8 (1982) 229–255, a higher oxide which generally belongs to a quasi(geometric)-hexagonal system and has a layered structure, wherein lattice extends in the c-axis direction compared with the β-type hydroxide and nickel valence is higher than 3.0. It is also known that this γ-nickel oxyhydroxide contains an alkaline cation in the crystal.

Therefore, the cobalt average valence of the cobalt oxide x was evaluated by the following procedure. First, a predetermined amount of the cobalt oxide x and ammonium ferrous sulfate[II] $FeSO_4(NH_4)_2SO_4$ were mixed, and the mixture was dissolved in concentrated hydrochloric acid. In this process, a Co ion having a valence of larger than 2 oxidizes a $Fe^{2+}$ ion to form a $Fe^{3+}$ ion, and the Co ion itself is reduced to form a $Co^{2+}$ ion. Then, the total amount of $Co^{2+}$ in the resultant aqueous solution was quantitatively determined by the IPC emission spectral analysis (quantitative value 1). On the other hand, the amount of $Fe^{3+}$ formed previously was determined by the redox titration using an aqueous potassium permanganate solution (quantitative value 2). The cobalt average valence of the cobalt oxide x was determined from both values according to the following formula:

2.0+(quantitative value 2)/(quantitative value 1)

The value was 3.42.

Separately, the cobalt oxide x was dissolved in concentrated hydrochloric acid and the resultant aqueous solution was subjected to the ICP emission spectral analysis. As a result, it was confirmed that $K^+$ is present in the oxide and the content corresponds to about 0.28 in molar ratio to cobalt.

The above analysis results strongly suggest that the higher cobalt oxide x corresponds to a so-called "γ-type" oxide if using the same nomenclature as is applied to nickel oxide. Cobalt and nickel show extremely similar behavior, for example, they differ in atomic number by only one and have similar ionic radius and, furthermore, their divalent hydroxides have the same crystal structures. Therefore, the present inventors considered that a crystal structure of the γ-type higher oxide is also present in the cobalt oxide, like the nickel oxide, and the higher cobalt oxide x was defined as "γ-cobalt oxyhydroxide". Assuming a layered structure of a hexagonal system (arrangement of a cobalt layer seen from the c-axis direction is composed of a repeated structure of ABC) with respect to this γ-cobalt oxyhydroxide, the lattice spacing and indexing were summarized with respect to six faces (h k l), wherein an intensity is large and a diffraction angle was precisely read, among twelve peaks shown as the X-ray diffraction pattern in FIG. 1. The results are shown in Table 2.

TABLE 2

| hkl | $d_{obs}$ (Å) | $I/I0_{obs}$ |
| --- | --- | --- |
| 003 | 6.85 | 100 |
| 006 | 3.42 | 35 |
| 101 | 2.43 | 20 |
| 102 | 2.39 | 25 |
| 105 | 2.10 | 22 |
| 110 | 1.42 | 13 |

4.1.2. Examination of the past literatures and consideration thereto

The structure shown in Table 2 is extremely similar product of "anodic CoOOH (I)" shown as a study about a cobalt electrode of P. Benson et al. in Electrochim. Acta, 9 (1964) 275–280. They defined a cobalt oxide having a strong X-ray diffraction peak at a lattice spacing of about 6.8 angstroms, including "anodic CoOOH (I)"as "β-CoOOH" in the literature, and suggested to distinguish it from an oxide "$CoHO_2$" having poor conductivity obtained by air oxidation of cobalt hydroxide. The oxide "$CoHO_2$" has a hexagonal-rhombohedral structure, and the length of the c-axis of an unit lattice of a hexagonal crystal is 13.13 angstroms and a lattice spacing of the c-axis direction is ⅓ of the above value, i.e. 4.38 angstroms. However, if classification of cobalt is performed in the form with coordination in the manner of the classification of H. Bode et al. (Electrochim. Acta, 11 (1966) 1079–1087) which is widely accepted about the nickel hydroxide and its oxide at present, the above described "anodic CoOOH (I)" wherein lattice extension in the c-axis direction is recognized and the higher cobalt oxide x described in Table 2 should be designated as "γ-CoOOH" (γ-cobalt oxyhydroxide).

As a study on a cobalt additive of a non-sintered type positive electrode for alkaline storage batteries, Oshitani et al. in YUASA-JIHO, 65 (1988) 28–40 showed that the divalent cobalt hydroxide includes an "α type" wherein the lattice spacing in the c-axis direction extends and a "β type" wherein the lattice spacing in the c-axis does not extend similar to the classification of H. Bode et al. in the nickel hydroxide. They reported that, when these divalent cobalt oxides added in the positive electrode are oxidized by initial charging, thereby to be converted into oxides whose lattice spacing in the c-axis direction is about 4.4 angstroms, effectively functions to impart the conductivity. Unlike P.

Benson et al., Oshitani et al. referred to the above oxide having conductivity as "β-CoOOH" and this nomenclature has a coordination with the classification of H. Bode et al. about nickel and is generally accepted. Namely, according to a conventional general consideration, "β-CoOOH" refers to cobalt oxyhydroxide having the conductivity, wherein extension is not recognized in the lattice spacing in the c-axis direction compared with the length of the c-axis (4.65 angstroms) of β-Co(OH)$_2$. It is considered that this "β-CoOOH" may be that which has the same crystal structure as that of the oxide (described as CoO(OH) in the JCPDS file, File No. 7-169, lattice spacing in the c-axis direction: 4.384 angstroms) referred to as "CoHO$_2$" by P. Benson et al. and has low crystallinity.

Regarding the oxide CoO(OH), since a crystallite itself has poor electronic conductivity, those having high crystallinity (referred to as "CoHO$_2$") have very low conductivity as shown in the report of P. Benson et al. However, when the crystallinity is lowered by adjusting the production conditions, the conductivity is increased because of the combination of a reduction in size of the crystallite itself and an increase in interface between crystallite-crystallite (this interface serves as an electronic conductive surface). There are some reports (as reported in the Proceedings of the 37th Battery Symposium in Japan, p.371, 1996, for example) on this respect recently. It is considered that the electrochemical behavior of CoO(OH) having low crystallinity (obtained by electrochemical oxidation of CoO in an alkaline electrolyte, containing partial Co$_3$O$_4$,) shows the charge/discharge behavior of "β-CoOOH" having the conductivity after all.

4.1.3. Classification about the reaction of cobalt oxide

Figure 2:
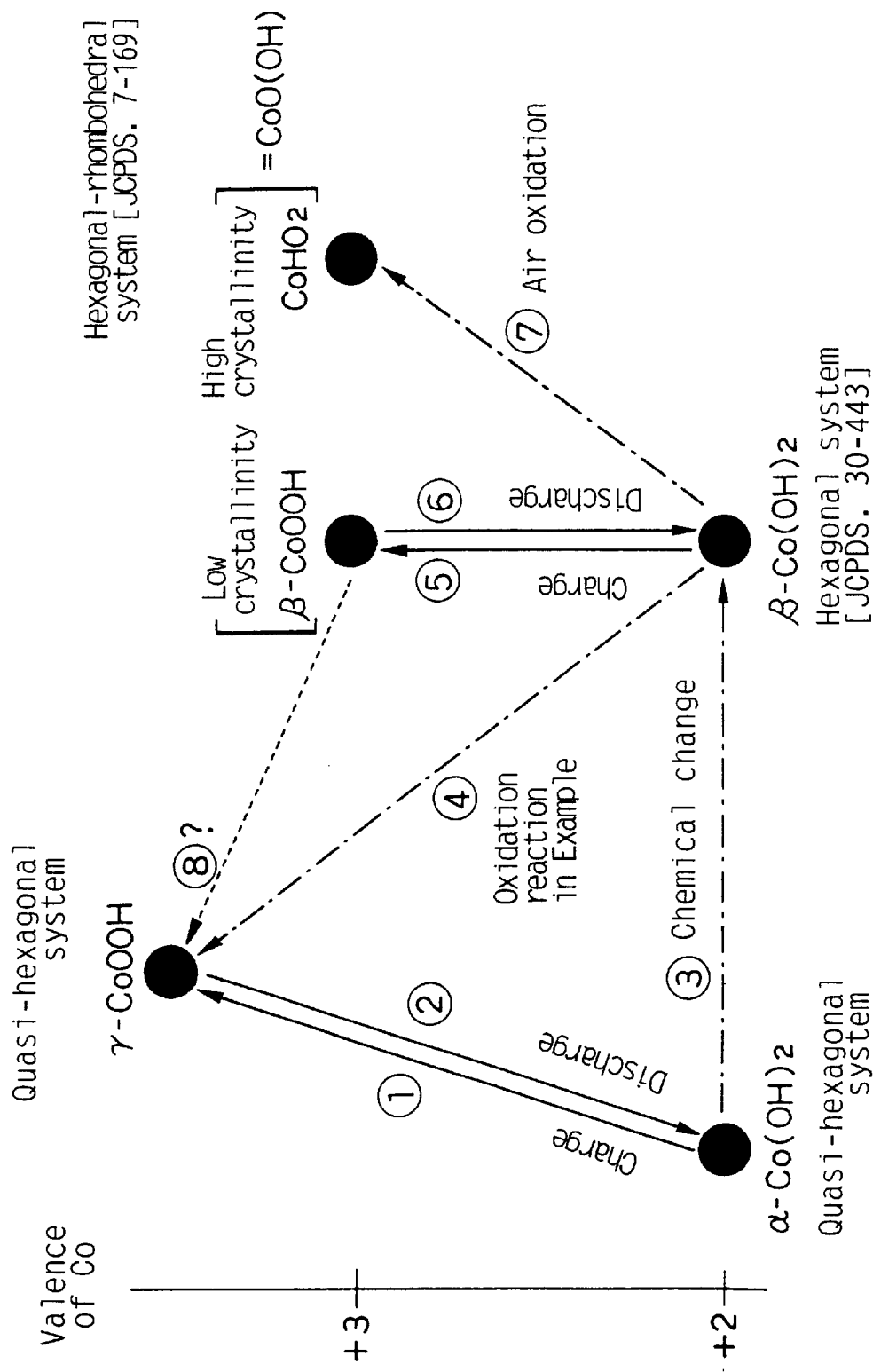
FIG. 2 is a diagram showing a relation between a change in cobalt hydroxide due to the reaction, and a cobalt valence.

The classification about the above described cobalt oxide, particularly cobalt hydroxide, is summarized in the manner of a diagram of H. Bode et al., as shown in FIG. 2. The divalent cobalt oxide which was often used in a conventional non-sintered positive electrode for alkaline storage batteries includes three kinds such as α-Co(OH)$_2$, β-Co(OH)$_2$ and CoO. The α-Co(OH)$_2$ is easily changed into β-Co(OH)$_2$ by the reaction of (3) in an alkaline electrolyte, and CoO is also easily changed into β-Co(OH)$_2$ by a chemical change in the alkaline electrolyte (not shown in FIG. 2). Therefore, the above three kinds of divalent cobalt oxides exist in the form of β-Co(OH)$_2$ at the initial charging. Accordingly, these cobalt oxides are oxidized by the reaction of (5) at the time of initial charging, thereby to form β-CoOOH having the conductivity. Since the crystallinity of the above β-Co(OH)$_2$ is high, the number of reaction sites for oxidation (reaction of drawing electrons and protons from the cobalt hydroxide) is reduced in the charge reaction of (5), almost all of which proceeds like the solid phase reaction and, therefore, the unreacted cobalt hydroxide having no conductivity in the interior of the crystal remains. It is considered that this amount depends on the conditions such as intensity of charge current at the initial charging, ambient temperature and composition of electrolyte.

The cobalt oxide containing β-CoOOH thus formed can be reduced (discharged) by the reaction of (6), but this reduction reaction does not occur at the charge/discharge potential region of a normal battery. Therefore, the cobalt oxide containing β-CoOOH serves as a conductive network for smoothly performing charge/discharge of the nickel hydroxide particles.

On the other hand, since the higher cobalt oxide x of the present invention, i.e. γ-CoOOH is obtained by vigorous oxidation of β-Co(OH)$_2$, it is considered that γ-CoOOH is formed by the reaction path of (4) in FIG. 2. It is known that, in the nickel hydroxide, γ-NiOOH is easily formed by overcharge of γ-NiOOH, but it is assumed that the corresponding reaction path ((8) in FIG. 2) does not occur easily in cobalt. This reason is as follows. That is, since a CoO (OH) crystal as a basic structure of γ-CoOOH has a strong hydrogen bond between oxygen-oxygen compared with β-NiOOH, in order to extract protons from the crystal structure to cause the cobalt to reach higher oxidation state, a very large energy is required. Cobalt differs from nickel in this respect.

Not shown in FIG. 2, the cobalt oxide and nickel oxide differ in the following two respects. One is solubility of the divalent cobalt oxide in an aqueous concentrated alkaline solution, and another one is an existence of Co$_3$O$_4$ (cobalt (II, III) oxide) having a spinel structure. With respect to the former, the divalent cobalt oxide has not so high solubility but dissolves in an aqueous concentrated alkaline solution as a cobalt complex ion HCoO$_2^-$. It is not apparent that this behavior takes part in the reaction of (3), (4) and (5) in FIG. 2 to any degree. With respect to the latter, Co$_3$O$_4$ peculiar to the cobalt oxide is extremely thermodynamically stable. Accordingly, any hydroxide shown in FIG. 2 can be changed into Co$_3$O$_4$ by firing at high temperature and Co$_3$O$_4$ having a valence of 2.67 is easily formed under a specific condition in the oxidation of (4), (5) and (7). Consequently, proceeding of the oxidation to the higher state is prevented. As described above, the cobalt oxide and nickel oxide can be classified in a considerably similar manner as shown in FIG. 2, but differ in several respects.

The test results described in the above literature of P. Benson et al. will be explained with reference to FIG. 2. First, it is apparent that the synthesized cobalt hydroxide used as a starting material by them is α-Co(OH)$_2$ because of the description of "blue color" and the X-ray diffraction results (lattice spacing in the c-axis direction: 8.4 angstroms). The formation of "anodic CoOOH (I)" by electrochemical oxidation in an aqueous KOH solution corresponds to the reaction of (1). Also, "anodic CoOOH (II)" shown by them corresponds to those wherein partial β-CoOOH and Co$_3$O$_4$ are included in γ-CoOOH. The γ-CoOOH can also be formed by the mechanism of α→γ. When α-Co(OH)$_2$ is added to the non-sintered positive electrode for alkaline storage batteries, a certain time is required before initial charge is performed after pouring an electrolyte into the battery. Therefore, during this period of time, the reaction of (3) proceeds and the reaction of (1) scarcely occurs. On the other hand, "CoHO$_2$"obtained by standing the cobalt hydroxide in the aqueous KOH solution is formed by converting α-Co(OH)$_2$ as a starting material into β-Co(OH)$_2$ according to the reaction of (3), followed by oxidation of (7) with dissolved oxygen in the solution. With respect to this, observation results described as a change in color of the oxide (blue→white→pink→brown) correspond to blue of α-Co(OH)$_2$, white-pink of β-Co(OH)$_2$ and brown of CoHO$_2$, respectively. Therefore, it is considered that the above judgment is right.

As described above, according to the diagram shown in FIG. 2, all behaviors of the cobalt oxide (particularly, cobalt hydroxide) which have hitherto been reported can be explained clearly. Thus, it is found that the higher cobalt oxide x of the present invention is γ-CoOOH having a cobalt valence higher than 3 and is not present in a conventional positive electrode for alkaline storage batteries.

4.1.4. Consideration about crystal structure

Figure 3:
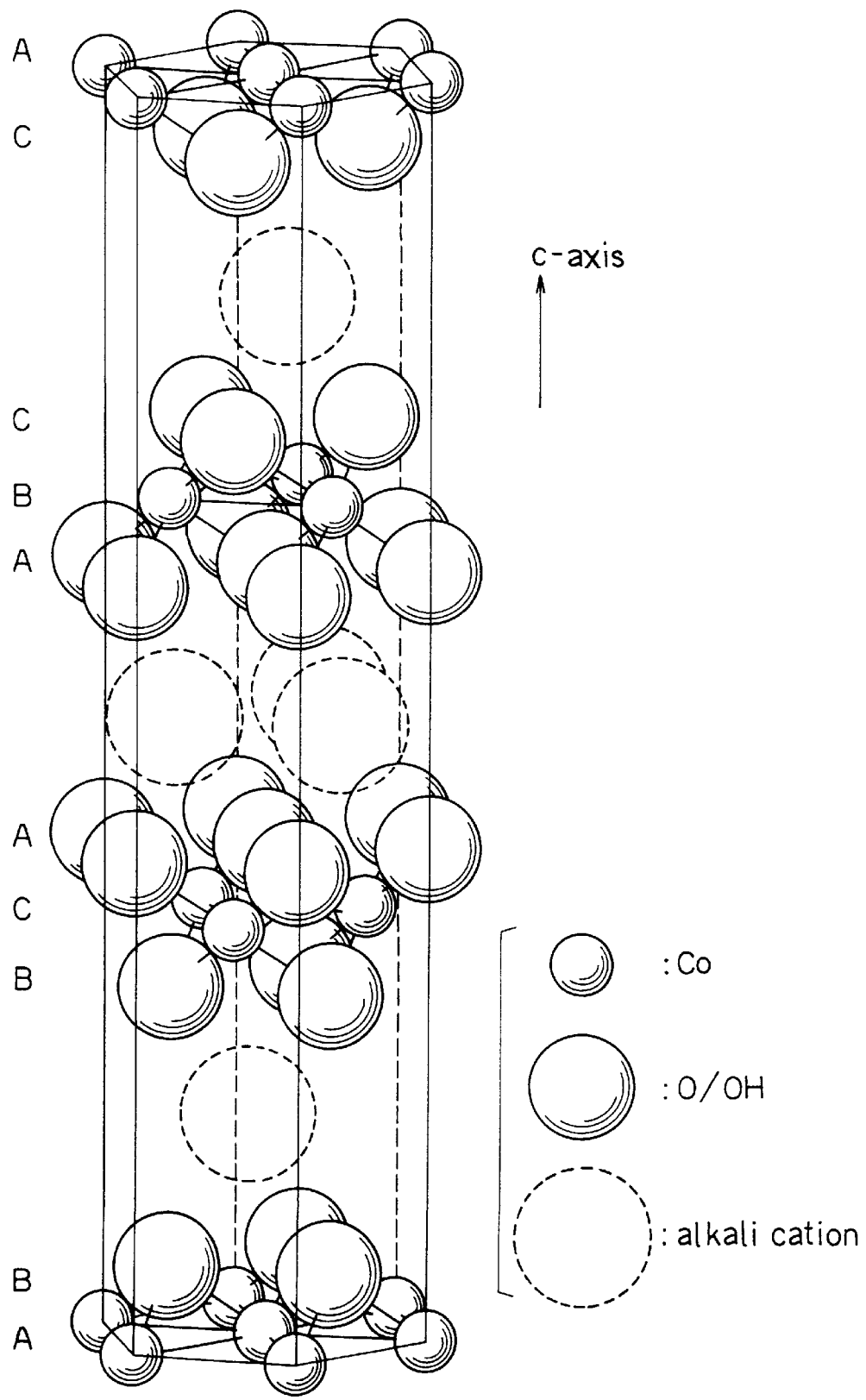
FIG. 3 is a schematic diagram showing an expected crystal structure of γ-cobalt oxyhydroxide.

A schematic diagram of an assumed crystal structure of γ-cobalt oxyhydroxide is shown in FIG. 3. Considering that it has the same crystal structure as that of γ-nickel oxyhydroxide, basically, the literature about γ-nickel oxyhydroxide was cited as reference. In FIG. 3, γ-cobalt oxyhydroxide is a cobalt oxide which belongs to a quasi-hexagonal system and has a layered structure, wherein the lattice extends in the c-axis direction. A periodic arrangement of a cobalt layer seen from the c-axis direction is composed of a repeated structure of ABC, and is a repeated structure of ACCBAACBB seen from a packing of cobalt-oxygen-oxygen-cobalt. Paying attention to only this fact, it can also take a unit lattice of a rhombohedral system, geometrically. It is estimated that a site formed between six oxygen ions or hydroxide ions arranged in the form of a trigonal prism in FIG. 3 can contain a sphere having a radius of about 1.64 angstroms by geometric calculation using a found value of the lattice spacing shown in FIG. 2 and general effective ionic radiuses: $r_{co}$=0.68 angstroms (typical value of trivalent-six-coordinate: 0.685 angstroms and tetravalent-six-coordinate: 0.67 angstroms) and $r_o$=1.25 angstroms (typical value of divalent-six-coordinate of $O^{2-}$: 1.26 angstroms and divalent-six-coordinate of $OH^-$: 1.23 angstroms). As shown by a dotted sphere in FIG. 3, this site is partially occupied by potassium ions. This fact can also be understood by the fact that an effective ionic radius of potassium $r_k$=1.52 angstroms (note: since a typical value of trigonal prism six-coordinate is scarcely known, a general value of octahedral six-coordinate of is used in place of it) is considerably close to the size of the site estimated by calculation. Since a water molecule has a size close to that of this site, it is assumed that the water molecule is incorporated into the site.

Figure 4:
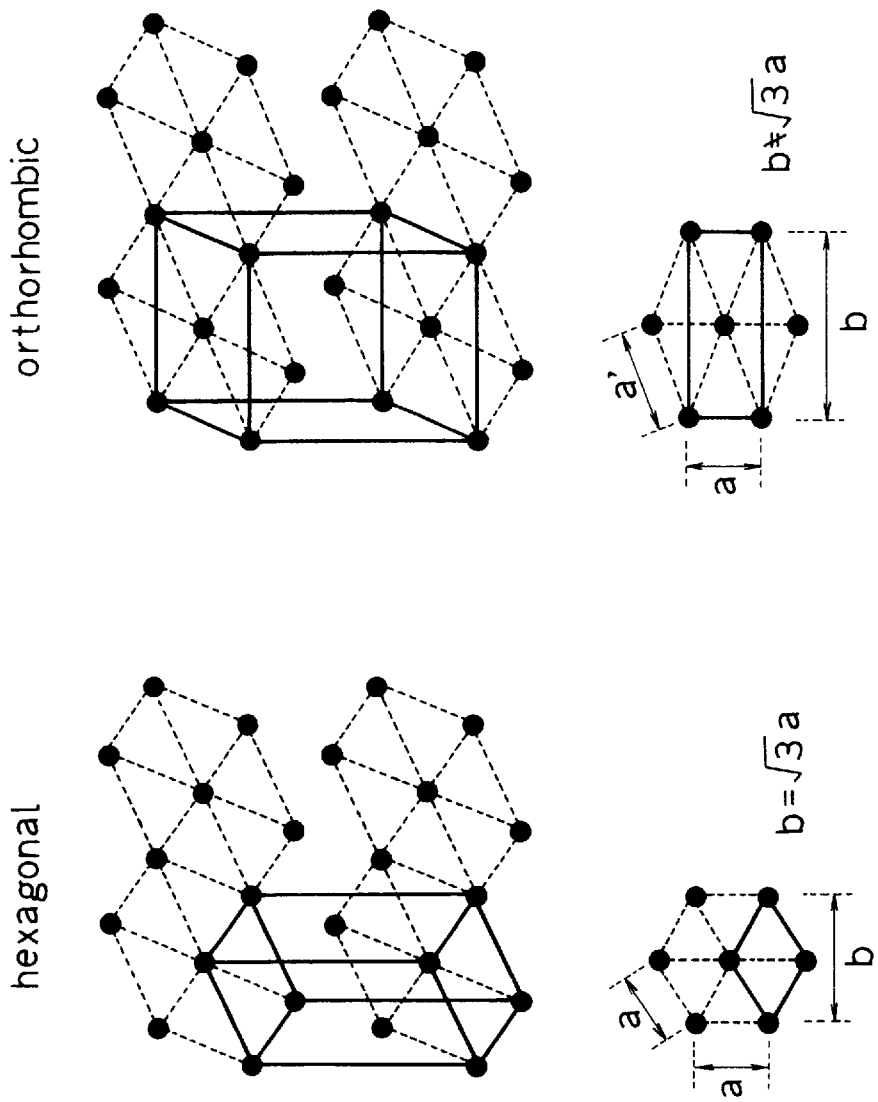
FIG. 4 is a schematic diagram showing a relation between a hexagonal system and an orthorhombic system with a change in length of the a-axis.
Figure 5:
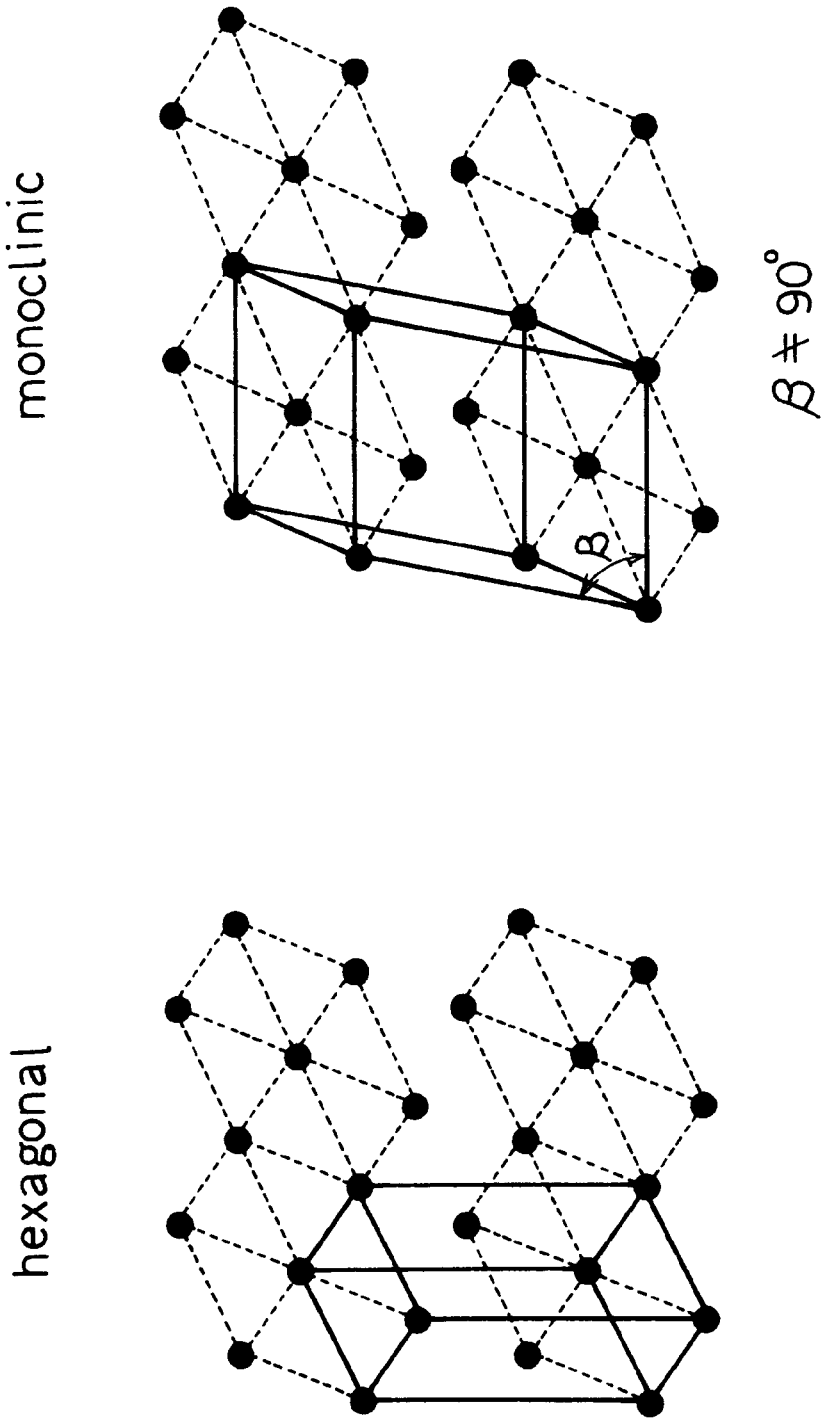
FIG. 5 is a schematic diagram showing a relation between a hexagonal system and a moloclinic system with a change in length of the c-axis.

In the crystal, a geometrically equivalent site is present at the position other than that shown by the dotted sphere in FIG. 3. However, since the position occupied actually by potassium ions cannot be found strictly, the site position is shown within the range where it can be easily observed as the schematic diagram. Furthermore, in FIG. 3, an accurate hexagonal crystal structure with no strain is schematically shown. With the occupation by potassium ions in the crystal, when the a-axis length slightly changes from the state shown in the left side of FIG. 4 to the state shown in the right side of FIG. 4, an orthorhombic crystal is obtained. When the c-axis angle changes from 90 degrees to some lesser or greater value at the state shown in the left side of FIG. 5 to the state shown in the right side of FIG. 5, a monoclinic crystal is obtained. However, it is quite difficult to perform a strict clarification in this respect.

4.1.5. Analysis of electrochemical behavior

In order to understand an electrochemical behavior of γ-cobalt oxyhydroxide, a porous foamed nickel substrate (1 cm×1 cm) welded with a lead wire was filled with a higher cobalt oxide x, and then pressed, thereby to produce a test electrode. Thereafter, the measurement of cyclic voltammetry was conducted under the following conditions.

Electrolyte: prepared by dissolving 40 g/l of $LiOH.H_2O$ in an aqueous KOH solution having a concentration of 31% by weight (specific gravity at 20° C.: 1.31)

Counter electrode: hydrogen storage alloy negative electrode (sufficiently activated by repeating charge/discharge in combination with another nickel hydroxide electrode)

Reference electrode: Hg/HgO electrode

Sweep condition: After sweeping within a range from a rest potential to +500 mV, it was carried out at a sweep rate of 1 mV/sec. within the range from +700 mV (oxidation side) to -700 mV (reduction side).

Ambient temperature: 20° C.

Figure 6:
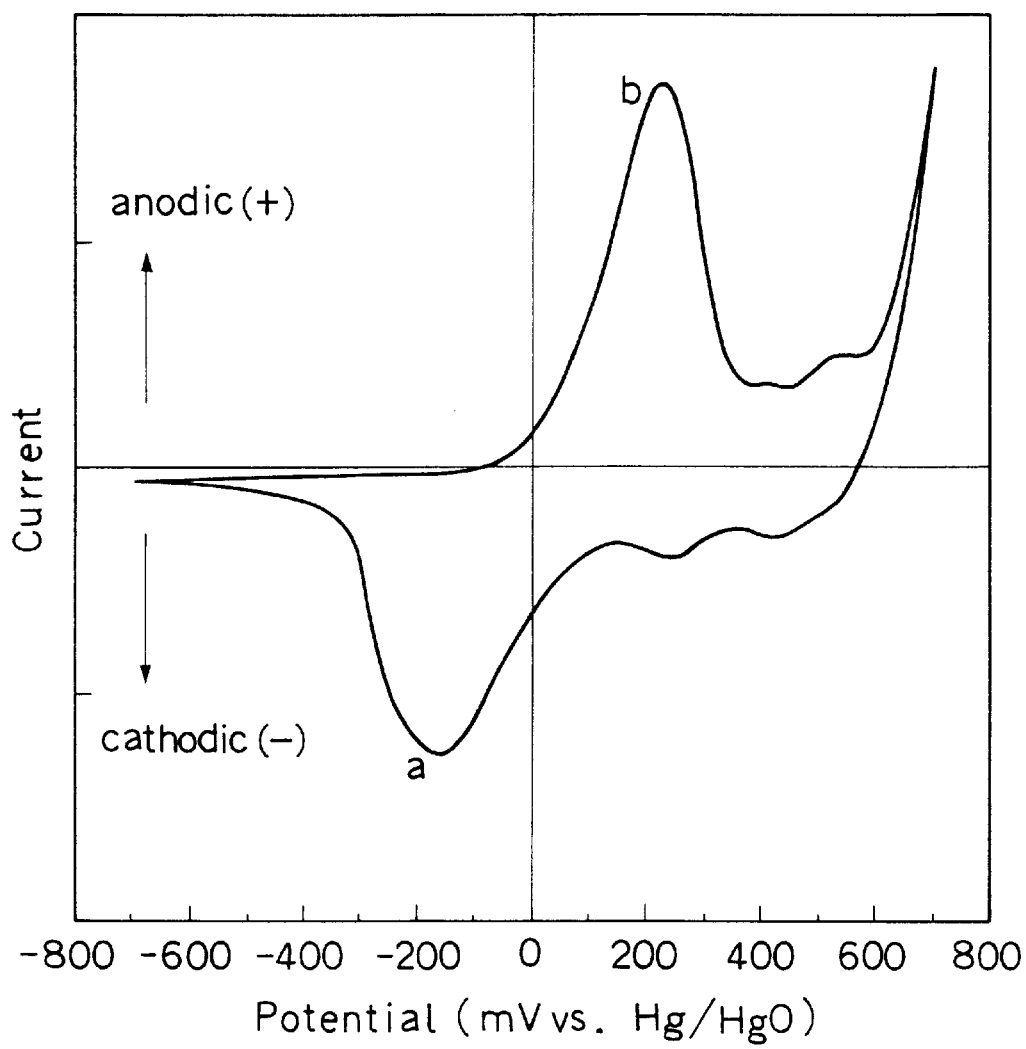
FIG. 6 is a graph showing a current-voltage curve obtained by cyclic volutammetry of a cobalt oxide x.

The results are shown in FIG. 6. As shown by the symbols "a", "b", a large charge/discharge peak can be observed. This shows that this oxide has high conductivity. A sharp anodic current peak at higher potential region than about +600 mV generates with evolution of oxygen on the test electrode. Considering the above diagram (FIG. 2), a cathodic current peak "a" in FIG. 6 corresponds to the reduction (discharge) from γ-cobalt oxyhydroxide to α-cobalt hydroxide and, to the contrary, an anodic current peak "b" corresponds to the oxidation (charge). The charge/discharge potential in this γ/α system transfers to the base direction by about 50 to 100 mV compared with a conventional β/β system. It is considered that this phenomenon is the same as that which is well known with respect to γ-nickel oxyhydroxide.

Figure 7:
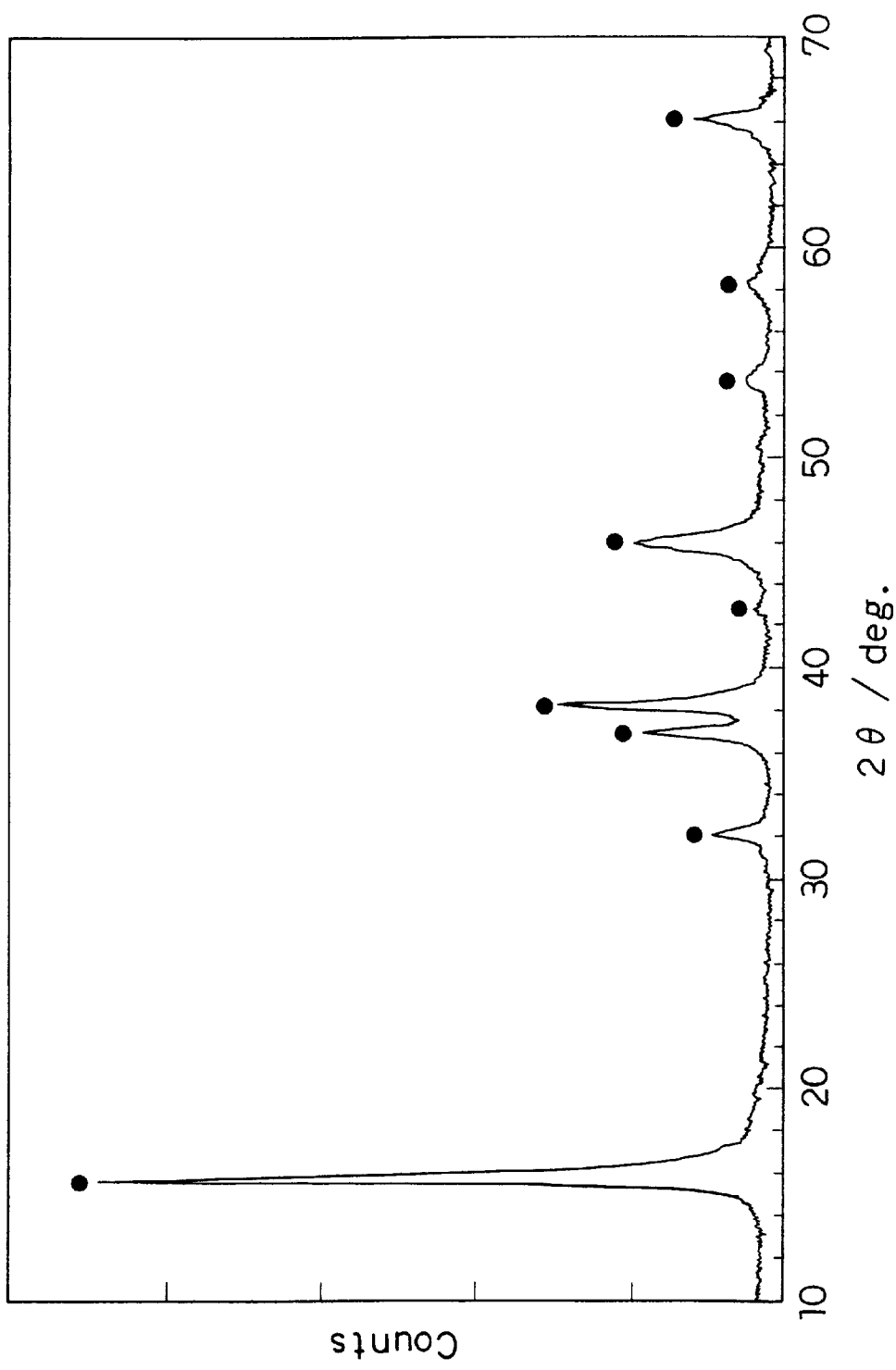
FIG. 7 is a graph showing an X-ray diffraction pattern of a higher cobalt oxide y obtained in the Example of the present invention.

4.2. Higher cobalt oxide y 4.2.1. Analysis of crystal structure, valence, composition and electrochemical behavior A diagram showing an X-ray diffraction pattern of the higher cobalt oxide y of the present invention is shown in FIG. 7. As shown by a mark (black circle), at least nine peaks can be confirmed at a diffraction angle 2θ within the range from 10 degrees to 70 degrees. Therefore, the qualitative analysis of the compounds corresponding to these peak positions were carried out by the JCPDS inorganic material file. As a result, they agree well with the diffraction pattern of $Na_{0.6}CoO_2$ (File No.: 30-1181). This $Na_{0.6}CoO_2$ is a compound shown by C. Fouassier et al. in J. Solid State Chem., 6(1973)532–537, which belongs to a quasi (geometric)hexagonal system having a layered structure (strictly orthorhombic system), and the crystal structure of $Na_{0.6}CoO_2$ is suggested by them when considering the arrangement of the cobalt-oxygen layer: arrangement of cobalt-oxygen-oxygen-cobalt (ACCBAACBB) is the same as that shown in FIG. 3. Accordingly, the higher cobalt oxide y also has the structure shown in FIG. 3 as a basic structure.

Then, the average valence of the higher cobalt oxide y and the amount of an alkali metal ion ($Na^+$ in this case) were measured by the same method as shown in 4.1.1.

As a result, it has been found that the average cobalt valence of the oxide is 3.39 and a molar ratio of sodium to cobalt corresponds to about 0.31. Judging from these values, the cobalt oxide y is not the $Na_{0.6}CoO_2$ described above. This fact can be understood by the following fact that $Na_{0.6}CoO_2$ is obtained by firing a mixture of tricobalt tetraoxide ($Co_3O_4$) and sodium peroxide ($Na_2O_2$) while the higher cobalt oxide y is obtained from β-cobalt oxyhydroxide as a starting material by a quite different method. The average valence and alkali metal ion content of the cobalt oxide y are considerably close to the values with respect to the higher cobalt oxide x shown in 4.1.1.

Figure 8:
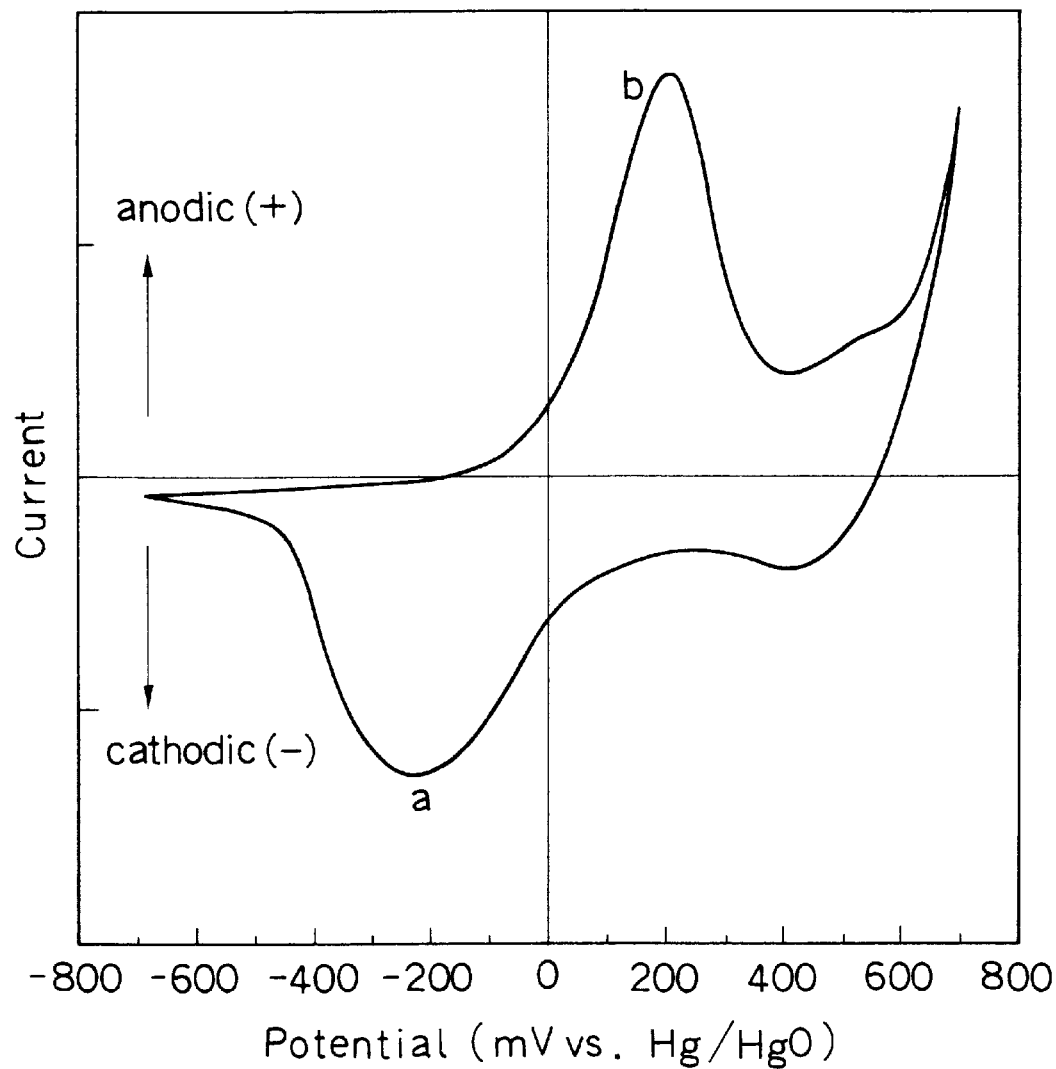
FIG. 8 is a graph showing a current-voltage curve obtained by cyclic volutammetry of a cobalt oxide y.

In order to understand the electrochemical behavior of the higher cobalt oxide y, analysis by cyclic voltammetry was performed under the same conditions as those shown in 4.1.5. The results are as shown in FIG. 8. The resulting behavior is almost the same as the charge/discharge behavior of the higher cobalt oxide x shown in FIG. 6. These test results show that the cobalt oxide y has high conductivity like the cobalt oxide x. At the same time, they show that giving and receiving of protons occurs in a reversible manner between the higher cobalt oxide y and the alkaline electrolyte and that protons are present in the higher cobalt oxide y. From this point of view, the cobalt oxide y is a sort of "cobalt oxyhydroxide".

The above analysis results strongly support that the cobalt oxide y has almost the same crystal structure, physical properties and electrochemical behavior as that of the cobalt oxide x, except that the interlayer distance in the c-axis direction is slightly different. Namely, the higher cobalt oxide y is also suitable for reference to as "γ-cobalt oxyhydroxide". Thus, the present inventors considered that the higher cobalt oxide y is also a sort of γ-cobalt oxyhydroxide and defined this as "Na-type γ-cobalt oxyhydroxide". Assuming the same layered structure as that shown in FIG. 3 with respect to this Na-type γ-cobalt oxyhydroxide, the lattice spacing and indexing were summarized with respect to six faces, wherein an intensity was large and a diffraction angle was precisely read, among nine peaks shown as the X-ray diffraction pattern in FIG. 7., as shown in Table 3, like Table 2.

TABLE 3

| hkl | $d_{obs}$ (Å) | $I/Io_{obs}$ |
|-----|---------------|--------------|
| 003 | 5.57 | 100 |
| 006 | 2.78 | 10 |
| 101 | 2.42 | 19 |
| 102 | 2.35 | 32 |
| 105 | 1.97 | 20 |
| 110 | 1.41 | 13 |

4.2.2. Consideration about crystal structure

The crystal structure of the Na type γ-cobalt oxyhydroxide will be considered. It has already been described with reference to FIG. 3 that γ-cobalt oxyhydroxide is a cobalt oxide which belongs to a quasisystem hexagonal system and has a layered structure, wherein the lattice extends in the c-axis direction, and that a packing of cobalt-oxygen-oxygen-cobalt seen from the c-axis direction is composed of a repeated structure of ACCBAACBB. Therefore, with respect to the Na-type γ-cobalt oxyhydroxide, a radius of a space formed between six oxygen ions or hydroxide ions arranged in the form of a triangle prism was estimated by geometric calculation based on the lattice spacing shown in Table 3 and effective ionic radiuses used in 4.1.4. As a result, it is about 1.15 angstroms. This value generally agrees with the effective ionic radius of sodium $r_{Na}$=1.16 angstroms (six-coordinate) and the space is occupied by sodium ions.

In FIG. 3, the hexagonal crystal structure with no strain is schematically shown. As previously described in 4.1.4., this structure can be changed into that of the orthorhombic or monoclinic system by a slight change in a-axis length and c-axis angle. The details cannot be clarified, but it is assumed that a difference in intensity ratio of the X-ray diffraction peak between FIG. 1 and FIG. 7, that is, a difference in $I/Io_{abc}$ between Table 2 and Table 3, reflects the above respects. Furthermore, as is apparent from the calculation results shown in 4.1.4. and the above calculation results, it is considered that the lattice spacing of the (003) plane strongly depends on the size of the alkali cation which occupies the space.

5. Relation between physical properties of γ-cobalt oxyhydroxide and positive electrode characteristics As described above, the higher cobalt oxides x, y of the present invention are γ-cobalt oxyhydroxides. Summarizing for the purpose of clearly distinguishing from β-cobalt oxyhydroxide based on the above described considerations, γ-cobalt oxyhydroxide is a cobalt oxide which generally belongs to quasi(geometric)-hexagonal system, more strictly to any one crystal system of hexagonal, orthorhombic and monoclinic systems, and has a layered structure as shown in FIG. 3., wherein the lattice spacing extends in the c-axis direction compared with β-Co(OH)$_2$ (e.g. 5.5 to 7.0 angstroms) and an average valence of cobalt is higher than 3.0. It is considered that the electronic conductivity is imparted to the cobalt layer of the crystallite due to the fact that the valence of cobalt reaches higher than 3.0 and, therefore, γ-cobalt oxyhydroxide has high conductivity compared with γ-cobalt oxyhydroxide. Therefore, in the non-sintered positive electrode for alkaline storage batteries using γ-cobalt oxyhydroxide as the conductive agent, the utilization of the nickel hydroxide particles is improved.

The electrochemical behavior of γ-cobalt oxyhydroxide is shown in FIG. 6 or FIG. 8 and the charge/discharge potential of the γ/α system in this case shifts to the base direction by about 50 to 100 mV compared with a conventional β/β system. Such electrochemical behavior of γ-cobalt oxyhydroxide is closely related to the capacity recovery after storage under short circuit shown in 3. That is, since γ-cobalt oxyhydroxide has high conductivity, it also maintains the electric conductivity between a lot of nickel hydroxides and the substrate skeleton during storage under short circuit. Since γ-cobalt oxyhydroxide itself has been oxidized to the state where the valence exceeds 3.0 and the reduction potential in the alkaline electrolyte is lower than that of β-cobalt oxyhydroxide as described above, it is not easily reduced to the state where the valence is 2.0 (state of dissolving in the electrolyte). Therefore, it is possible to inhibit the destruction of the conductive network caused by intensive proceeding of the reduction in the vicinity of the substrate skeleton during storage under short circuit. Thus, in the non-sintered positive electrode for alkaline storage batteries using γ-cobalt oxyhydroxide as the conductive agent, there can be provided extremely high capacity recovery after storage under short circuit compared with a conventional positive electrode.

As described above, it is possible to find a clear relation between the characteristics of the non-sintered positive electrode for alkaline storage batteries shown in 3. and the physical properties of γ-cobalt oxyhydroxide shown in 4.

Figure 9:
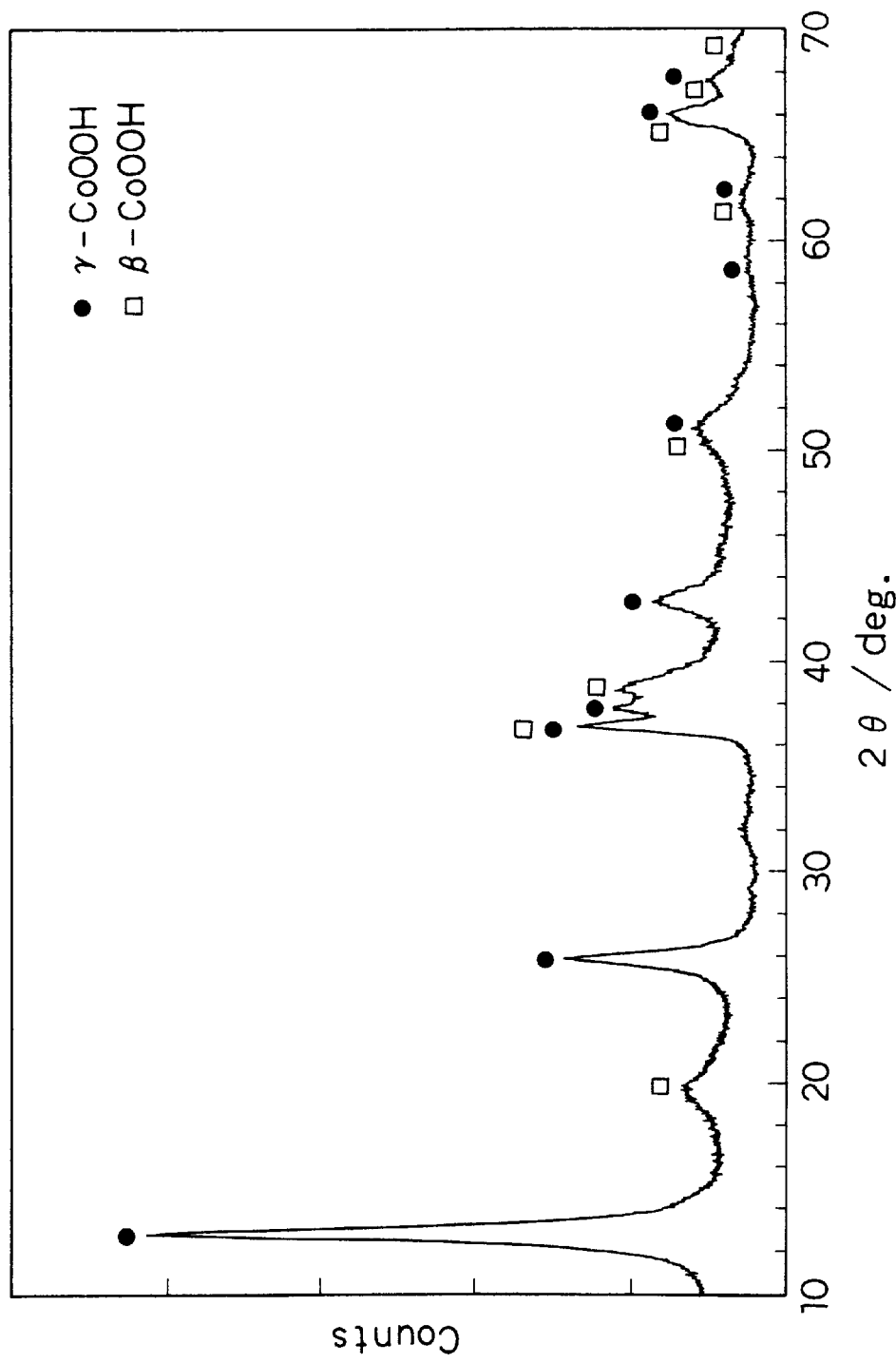
FIG. 9 is a graph showing an X-ray diffraction pattern of an oxide wherein of some β-cobalt oxyhydroxide is present in γ-cobalt oxyhydroxide as a contaminant phase.

The above higher cobalt oxides x and y were observed to have a generally single phase by X-ray diffraction. It was confirmed by another experiment that almost the same electrode characteristics are obtained with a positive electrode using γ-cobalt oxyhydroxide oxidized in the presence of KOH (caused by a delicate difference in water content of alkaline funiculars formed on oxidation treatment), as the conductive agent. This γ-cobalt oxyhydroxide described above has some β-cobalt oxyhydroxide as a contaminant phase as is apparent from the X-ray diffraction pattern shown in FIG. 9. With respect to those wherein a small amount of Co$_3$O$_4$ as a contaminant phase is present in γ-cobalt oxyhydroxide oxidized in the presence of KOH, those wherein a small amount of β-cobalt oxyhydroxide as a contaminant phase is present in γ-cobalt oxyhydroxide (Na-type γ-cobalt oxyhydroxide) and those wherein a small amount of Co$_3$O$_4$ as a contaminant phase is present in Na-type γ-cobalt oxyhydroxide (not shown in the X-ray diffraction diagram), the same test results were obtained. Namely, as far as γ-cobalt oxyhydroxide is used as a main component, these partial impurities do not exert a large influence on the positive electrode characteristics.

Among the literature about γ-nickel oxyhydroxide, there are γ-nickel oxyhydroxides having an ideal structural formula of K(NiO$_2$)$_3$ and those having a slightly different structural formula of Ni$_{0.75}$K$_{0.25}$OOH. Considering the similar structural formula: M(CoO$_2$)$_3$ or Co$_{0.75}$M$_{0.25}$OOH (M is K or Na) with respect to γ-cobalt oxyhydroxide, a molar ratio of M/Co is assumed to be 0.33 in upper limit, which is not so different from the found value obtained in 4.1.1. or 4.2.1. However, an oxide having a perfect ideal structure is rarely obtained. The M/Co value of all γ-cobalt oxyhydroxides containing the above was about 0.20 (found value). Accordingly, it can be said that, if the molar ratio is within a range from about 0.20 to 0.33, the positive electrode characteristics do not vary.

In the oxidation on preparation of the sample of 1., a method of mixing a cobalt hydroxide standard sample with a ground powder of an alkali particulate reagent, and heating the mixture while feeding air was used. The reason is as follows. That is, in case of oxidizing the cobalt hydroxide of fine particles (having a particle diameter of 0.2 $\mu$m, a BET specific surface area of 25 m$^2$/g and extremely large wetting properties to liquid) alone, the above method is most preferable in preparing an alkaline funicular suitable for the oxidation. Accordingly, the oxidation treatment method and detailed treatment conditions of Co(OH)$_2$-coated nickel hydroxide particles shown in the following Example 2 are quite different from those described above.

EXAMPLE 2

6. Preparation of Co(OH)$_2$-coated nickel hydroxide particles

Co(OH)$_2$-coated nickel hydroxide particles as a raw material were prepared by the following procedure. First, nickel hydroxide particles with cobalt and zinc incorporated therein obtained according to the same manner as that described in Example 1 were used as nickel hydroxide particles which are mother particles.

The above solid solution nickel hydroxide particles were charged in an aqueous cobalt sulfate solution and an aqueous sodium hydroxide solution was slowly added dropwise, followed by continuous stirring while adjusting so that the pH of the aqueous solution at 35° C. is maintained at 12, thereby to obtain Co(OH)$_2$-coated nickel hydroxide particles. A weight of the cobalt hydroxide coating layer was adjusted so that a weight ratio of the coating layer to the total weight of the Co(OH)$_2$-coated nickel hydroxide particles becomes 5.0% by weight. The obtained Co(OH)$_2$-coated nickel hydroxide particles were washed with water and then vacuum-dried.

It was confirmed by the measurement using a laser diffraction type particle size distribution meter that the Co(OH)$_2$-coated nickel hydroxide particles thus obtained had an average particle diameter of about 10 $\mu$m. It was also confirmed by the observation using a scanning electron microscope (SEM) and a transmission electron microscope (TEM) that the cobalt hydroxide of the coating layer had a thickness of about 0.1 $\mu$m and the whole surface of the particles were coated with the coating layer. The BET specific surface area of the particles was about 7 m$^2$/g.

7. Oxidation treatment to Co(OH)$_2$-coated nickel hydroxide particles 7.1. Description of reaction device Then, the above Co(OH)$_2$-coated nickel hydroxide particles were subjected to an oxidation treatment. First, a device used in the treatment will be described in detail.

Figure 10:
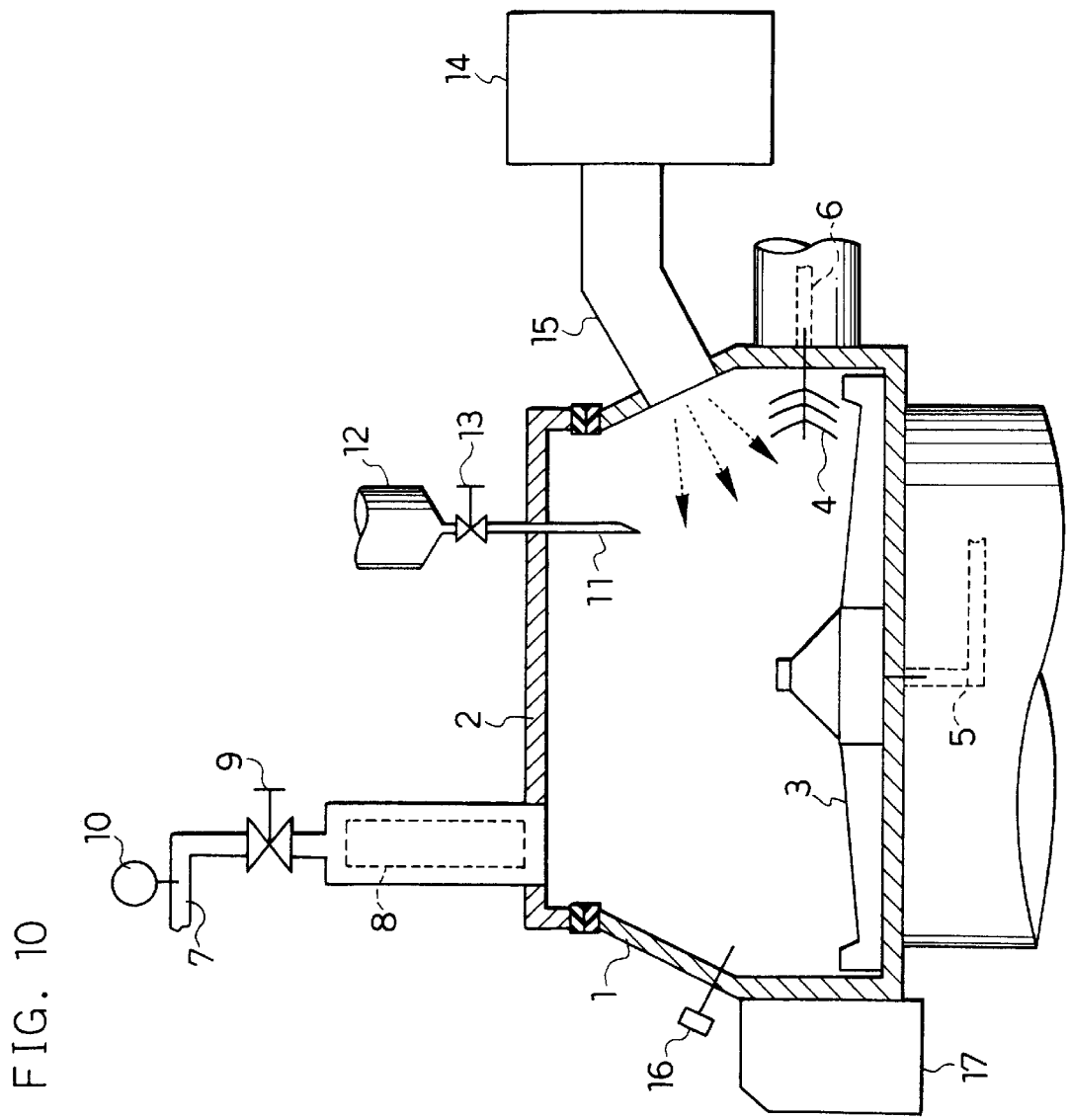
FIG. 10 is a sectional view showing a schematic construction of a reaction device used in the Example.

A sectional view showing a schematic construction of an oxidation treatment device used in this Example is shown in FIG. 10. The numeral 1 denotes a stainless steel container 1. The upper opening portion of the container 1 is airtightly closed with a stainless steel lid 2. The wall surface of the container 1 and the lid 2 are respectively provided with a jacket, and the inner wall surface can be heated or kept warm by passing hot water or steam through the jacket. The bottom portion of the container 1 is provided with an agitator blade 3, and the side surface is provided with a chopper blade 4 positioned over the upper end of the agitator blade 3. The particles charged in the container are mixed with stirring by these blades. The respective shaft portion of these blades is provided with air inlet 5 or 6 as shown by the dotted lines, and compressed air can be fed into the container 1. The lid 2 is provided with an air outlet 7, and air passed through a bag filter 8 can be discharged from the container 1 by opening an air discharge valve 9. The bag filter 8 is provided with heating means (not shown) for preventing dew condensation and particle shaking means (pulse air system) for preventing clogging. A thermo/hygrometer 10 mounted in the vicinity of the air outlet 7 is used for monitoring the wet state of the particles in the container by exclusively measuring the humidity of discharged air. A dropping tube 11 for adding dropwise an aqueous alkaline solution into the container is passed through the lid 2, and a predetermined amount of the aqueous alkaline solution contained in a liquid tank 12 can be charged in the container by opening a dropping valve 13. A microwave generator 14 is connected with the container through a waveguide 15 for leading a microwave into the container, and the microwave is irradiated in the form shown by the dotted arrows in FIG. 10, thereby to heat the particles in the container. In the microwave generator 14, its output is adjusted automatically by a controller so that the indicated value of a contact type thermometer 16 (for measuring the temperature of the particles) mounted on the wall of the container is maintained at the set temperature. The respective portions including the air outlet are sealed and protected with a metal mesh (not shown) for the purpose of preventing leakage of the microwave from the container. The numeral 17 denotes a discharge chute for removing the particles after treatment and, when removing the particles, a shutter is opened, thereby to communicate with the container.

Figure 11:
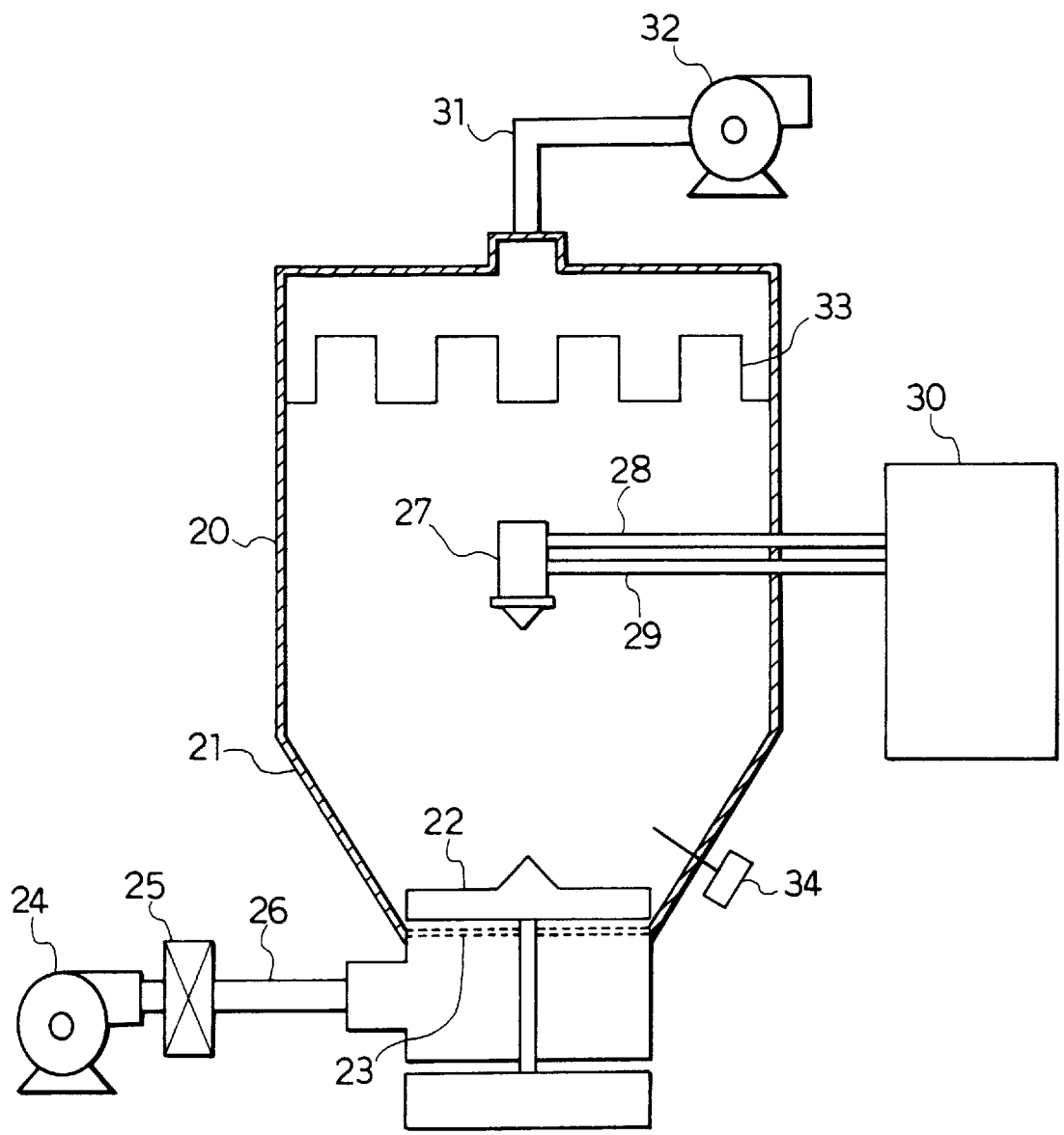
FIG. 11 is a sectional view showing a schematic construction of a batch fluidized drier used in the Comparative Example.

FIG. 11 shows a schematic construction of an oxidation treatment device (batch fluidized drier) of the Comparative Example. Regarding a cylindrical device cabinet denoted by 20, the wall surface of a conical portion 21 at the lower part is provided with a jacket, and the interior can be heated or kept warm by passing hot water or steam through the jacket. The bottom portion of the cabinet 20 is provided with a stirring blade 22 for stirring the particles, and a rectification board 23 with a lot of pores is provided under the blade 22. A blower 24 is used for feeding air heated by a heater 25 into the cabinet through a piping 26. Heated air to be fed allows the particles to flow which are rectified on the rectification board 23 and stirred by the blade 22. The upper position of the cabinet 22 is provided with a spray nozzle 27 for spraying an aqueous alkaline solution. This spray nozzle 27 is connected with a tank 30 for storing the aqueous alkaline solution through a piping 28 for transferring compressed air and a piping 29 for transferring the aqueous alkaline solution. The tank 30 is provided with a compressor for producing compressed air. To the top portion of the cabinet 20, an exhauster 32 is connected through a piping 31. A bag filter 33 for preventing leakage of the flowing fine particles from the cabinet is provided with particle shaking means (pulse air system) for preventing clogging. The conical portion of the cabinet 20 is provided with a contact type thermometer 34, and the temperature of the flowing particles can be monitored by using it.

7.2. Procedure of heat oxidation treatment

Active material of Example

As a treatment device, "Microwave Drier, Model FMD" (trade name) manufactured by Fukae Powtec Co., Ltd. was used. The operation will be described in detail with reference to FIG. 10.

By passing steam of 110° C. through the jacket provided on the wall surface of the container 1 and the lid 2, the interior of the container was kept warm and 6.0 kg of Co(OH)$_2$-coated nickel hydroxide particles were charged therein. In the state where the lid 2 is closed and the air discharge valve 9 is opened, the agitator blade 3 and the chopper blade 4 were rotated, thereby to mix the particles with stirring, and then the aqueous alkaline solution was charged in the container. The aqueous alkaline solution used is an aqueous potassium solution having a concentration of 45% by weight (room temperature) and the amount of the solution added dropwise is 700 g. Then, the dropping valve 13 was closed and stirring was continued for about 3 minutes, thus completing the first step.

In this first step, the particles were converted into wet particles in the state of a generally uniform funicular. Then, feeding of air is terminated and the air discharge valve 9 was throttled so that the interior of the container became a generally airtight state. Then, the particles were continuously stirred while irradiating the microwave (frequency: 2450 MHz) from the waveguide 15 to heat the wet particles. The temperature of the wet particles became about 70° C. after the completion of the first step, by heat from the wall surface of the container, and reached the set temperature (110° C. in this case) by the following microwave irradiation for about 3 minutes. The above change in temperature of the particles was monitored by using the contact type thermometer 16 provided on the inner wall of the container. Thus, the second step has been completed.

Then, the air discharge valve 9 was opened and, at the same time, air (temperature: 50° C., humidity: 0.01 kg $H_2O$/kg dry air) was fed into the container through the air inlet 5 at the shaft portion of the agitator blade 3 and the air inlet 6 at the shaft portion of the chopper blade 4. At that time, the wet particles were continuously mixed and the microwave was irradiated while controlling so that indicated value of the contact type thermometer 16 was maintained at 110° C. In this state, the treatment was conducted for 20 minutes. As a result, the particles were dried, almost perfectly, and the reaction was completed. The judgment of the dry state of the particles was conducted by monitoring the thermo/hygrometer 10 mounted on the air outlet. Thus, the third step has been completed.

The particles thus obtained were agglomerate-free active materials wherein the coating layer is uniformly oxidized and had an indigo metallic luster. These particles were removed through the chute 17 for removing a product, washed with water, thereby to remove the excess alkaline component, and then dried to obtain a positive electrode material. A change in color of the particles due to washing and drying was scarcely observed. The resultant particles were taken as active material particles A.

According to the same manner as that described above except for using an aqueous sodium hydroxide solution (concentration of 45% by weight) in place of the aqueous potassium hydroxide solution, active material particles B were prepared. The resultant particles also had an indigo metallic luster.

Active material of Comparative Example

On the other hand, the above $Co(OH)_2$-coated nickel hydroxide particles were subjected to an oxidation treatment using a device of the Comparative Example. As the device, "New Marumerizer, Model NQ" (trade name) manufactured by Fuji Paudal Co., Ltd. was used. The operation of the oxidation treatment using this device will be described in detail with reference to FIG. 11.

First, by passing hot water of 80° C. through the jacket provided on the wall surface of the conical portion 21 of the cabinet, the interior of the cabinet was kept warm and 950 g of the same $Co(OH)_2$-coated nickel hydroxide particles as those used in Example 1 were charged therein. The stirring blade 22 was rotated, and then the heater 25, the blower 24 and the exhauster 32 were operated, thereby to produce an upward hot-air flow in the cabinet. In this case, hot air passed through the rectification board 23 to permit the charged $Co(OH)_2$-coated nickel hydroxide particles to fluidize with heating. In the state where the particles were fluidized, the aqueous alkaline solution was sprayed through the spray nozzle 27. The aqueous alkaline solution used was an aqueous potassium hydroxide solution of 25% by weight and an amount of the solution sprayed was 200 g per 10 min. Until completion of spraying, the aqueous alkaline solution was penetrated into the surface of the particles and the cobalt hydroxide of the coating layer became a higher oxide by an action of hot air. After the completion of spraying, the particles were further fluidized in hot air for 15 minutes, thereby to terminate the treatment. During a series of operations, the temperature of the particles was monitored with the contact type thermometer 34 and the hot air conditions were adjusted so that the treatment temperature became the set value (80° C. in this case). Then, the device was stopped and the particles were removed from the cabinet. The particles were washed with water to remove the excess alkali, and then dried to obtain a positive electrode material. This was taken as active material particles C. The resultant particles had a black color.

According to the same manner as that described above-except for using an aqueous sodium hydroxide solution (concentration of 25% by weight) in place of the aqueous potassium hydroxide solution, an active material D was prepared. The active material had a dark brown color.

8. Preparation of battery and evaluation

In order to confirm various characteristics of the positive electrode materials A to D obtained in the above procedure, preparation and evaluation of the batteries were performed by the following procedures.

To each of the samples A to D, a suitable amount of pure water was added to prepare an active material paste. Then, a porous foamed nickel substrate having a porosity of 95% and a thickness of 1.3 mm was filled with the active material paste and then dried in a drier at 80° C. The substrate was pressed by rolls to a thickness of about 0.7 mm. The resultant sheet was cut into pieces having a predetermined size, thereby to obtain a nickel positive electrode corresponding to four kinds of active materials A to D, respectively.

Four kinds of nickel positive electrodes thus prepared were combined with a hydrogen storage alloy negative electrode, a separator and an alkaline electrolyte, which were the same as those used in Example 1, thereby to produce a nickel-metal hydride storage battery (⅘ A size, nominal capacity of 1600 mAh), respectively. With respect to the respective batteries, the utilization of the respective positive electrodes was measured by the method shown in (1) of Example 1. Furthermore, the capacity recovery after storage under short circuit was evaluated by the method shown in the following item (3).

(3) Capacity recovery after storage under short circuit

After the evaluation of the item (1) was completed, a cycle of charging each battery at a charge rate of 1 C for 1.2 hours and then discharging at a discharge rate of 1 C until a voltage of the battery was reduced to 1.0 V was repeated (five cycles) and a capacity at the fifth cycle was measured. This battery was short-circuited using an electric resistance of 1 Ω and was then allowed to stand as it was under the atmosphere at 45° C. As the storage period, three levels, i.e.

3 days (short period), 2 weeks (intermediate period) and 1 month (long period) were set, and the test was carried out by using different batteries. After the above storage, a cycle of charging each battery at a charge rate of 1 C for 1.2 hours again and then discharging at a discharge rate of 1 C until a voltage of the battery is reduced to 1.0 V was repeated (five cycles) and a capacity at the fifth cycle was measured. According to the above measurement results, by dividing the value of the capacity of the battery after storage by the capacity of the battery before storage, the capacity recovery after storage under short circuit at three levels of each nickel positive electrode was calculated.

The evaluation results of the respective positive electrodes are shown in Table 4.

TABLE 4

| Active material | Utilization [%] | Capacity recovery after storage under short circuit [%] | | |
|---|---|---|---|---|
| | | Three days (short period) | Two weeks (intermediate period) | One month (long period) |
| A | 105.8 | 99.7 | 99.2 | 98.4 |
| B | 105.9 | 99.6 | 99.3 | 98.9 |
| C | 98.2 | 99.2 | 93.3 | 90.6 |
| D | 99.1 | 98.2 | 91.1 | 88.5 |

The positive electrode materials A, B obtained by the oxidation treatment (exclusively due to microwave heating) according to the present invention showed utilization higher than that of the active materials C, D of the Comparative Example, and the value is higher than 100%. Namely, the charge/discharge reaction of the nickel hydroxide occurs with the exchange of more than one electron. The active materials A, B are also superior in capacity recovery to the active materials C, D, and a difference between them is remarkable in a long-term storage. The above improvements may be due to further improved current collection performance of the conductive network of the positive electrodes, using the active materials A, B as compared to the positive electrodes using the active materials C, D. At the same time, it was suggested that there is a considerably large difference in physical properties of the cobalt oxide constituting the coating layer between the active material particles A, B and C, D.

In order to make these areas clear, the following powder analysis was performed with respect to the above four kinds of active material particles and cobalt oxides, which are related to the active material particles.

9. Powder analysis 9.1. Analysis of active material particles (1)

In order to make a difference in color, visually observed during testing, of the active material particles A to D clear, a colorimetry based on the diffuse reflection method was carried out by a spectral calorimeter (CM-3500d, manufactured by Minolta Co., Ltd.). In the case of measuring, the respective active material particles were charged in a petri dish (CM-A128, manufactured by Minolta Co., Ltd.) in a sufficient amount and the measurement was performed in the form of the powder without pressing together. If the powder is pressed together, a spectrum does not vary. The conditions are set as follows.

Illumination/light-receiving optical system: d/8 (diffused lighting/light-receiving in 8 degree direction), SCE (specular reflection light was eliminated)

Light source: $D_{65}$

Field of view: 10 degree

Measuring diameter: diameter of about 30 mm (using a target mask for petri dish CM-A127, manufactured by Minolta Co., Ltd.).

Reflection light due to a petri dish was eliminated by using a calibration glass (CM-A129, manufactured by Minolta Co., Ltd.).

Figure 12:
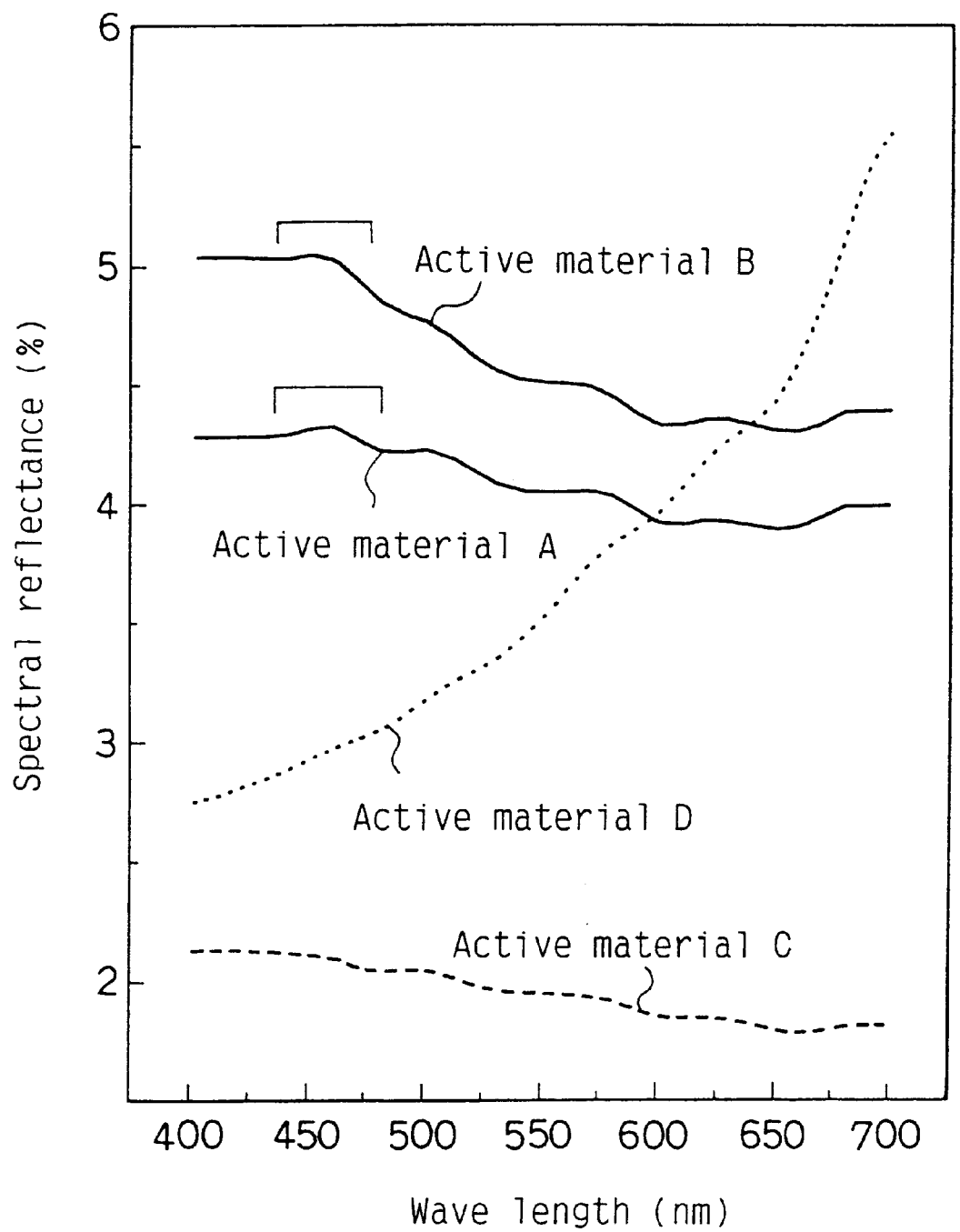
FIG. 12 is a graph showing a reflection spectrum of various active material particles measured by a spectral colorimeter.

The measurement results of the reflection spectrum are shown in FIG. 12. The active material particles A and B of the present invention, which were distinguished by the visually observed indigo metallic luster, have high reflectance over the whole region, that is, they are bright over the whole region and show a maximum reflectance at a wavelength of about 450 nm. Therefore, they appear to be indigo. The active material C of Comparative Example, which was distinguished by the visually observed black color, has low reflectance over the whole region. The active material D of Comparative Example, which was distinguished by the visually observed dark brown color, has strong reflection at the red color region. According to such a technique, a visually observed delicate difference in color of the particles can be quantitatively determined, clearly.

As the reason for causing the above difference in color, the following two reasons can be considered:

(1) reason which reflects a difference in shape of the particles, such as particle diameter and specific surface area of the active material particles, coating state of the cobalt oxide layer, etc.; and (2) reason which reflects a difference in electronic state of the cobalt oxide constituting the coating layer.

In order to examine the possibility of the item (1), with respect to four kinds of active material particles A to D, the measurement of the particle diameter and particle size distribution (using a laser diffraction particle size distribution meter), measurement of the specific surface area (BET method), observation of the surface of the particles by using a scanning electron microscope (SEM), observation of the cross section of the particles by using a transmission electron microscope (TEM) and observation of the Co distribution state of the surface/cross section of the particles by using an electron probe microanalyzer (EPMA) were performed. As a result, it was confirmed that a difference in particle size and specific surface area, coating state of the cobalt oxide layer, etc. was scarcely observed in the active material particles A to D, and the respective material particles have an average particle diameter of 10 $\mu$m and the same particle size distribution and, furthermore, the whole surface of each particle is perfectly coated with the cobalt oxide layer having a thickness of about 0.1 $\mu$m. Accordingly, it was judged that the difference in color is based on the above reason (2), not the above reason (1).

If the difference in color of the active material particles is based on the above reason (2), that is, the reason which reflects a difference in electronic state of the cobalt oxide constituting the coating layer, a difference in electric conductivity of the active material particles must be recognized.

Next, in order to confirm this respect, the respective active material particles A to D were formed into pellets and the electric conductivity was measured by the D.C. four-terminal method. As a result, a value of the electric conductivity of the active material particles A is almost the same as that of the active material particles B, and the order of the magnitude of the electric conductivity of the active material particles A, B, C and D is as follows: A, B>C>D. The active material particles A, B having an indigo color showed a value five times as much as that of the active material particles C having a black color, and showed a value ten or more times as much as that of the active material particles D having a dark brown color. Accordingly, the difference in color of the particles reflects the difference in electronic state of the cobalt oxide constituting the coating layer. Regarding the active material particles having an indigo color as shown in FIG. 12 (more specifically, active material particles wherein a spectral reflectance at the whole visible region is not less than 3.5% and a maximum value having the spectral reflectance of not less than 4.0% is present at a wavelength of about 450 nm), the electronic conductivity of the cobalt oxide is extremely high. Therefore, the utilization of the positive electrode is largely improved. In the batteries prepared by using the active materials A, B, it was confirmed that the active material particles (washed with water and dried) separated from the positive electrode by decomposing the battery after performing several cycles of charge/discharge also have an indigo color and the same colorimetry results described above are obtained. Namely, even if the charge/discharge reaction of the nickel hydroxide is conducted in the battery, the electronic state of the cobalt oxide constituting the coating layer does not vary and maintains high electronic conductivity.

Next, in order to make the structure of the cobalt oxide constituting the coating layer of the active material particles clear, the measurement of X-ray diffraction was performed. However, since the coating layer is a very thin layer (about 0.1 $\mu$m) for coating the surface of the particles, the resultant diffraction diagram only reflects the nickel hydroxide as mother particles and the diffraction peak having a relation to the cobalt oxide constituting the coating layer was not observed satisfactorily.

Therefore, the cobalt hydroxide standard sample prepared in the previous Example 1 was placed in the atmosphere, wherein potassium hydroxide or sodium hydroxide, water and air (oxygen) coexist, and oxidized under various conditions. Then, the X-ray diffraction measurement and the colorimetry by using a spectral calorimeter were carried out.

Figure 13:
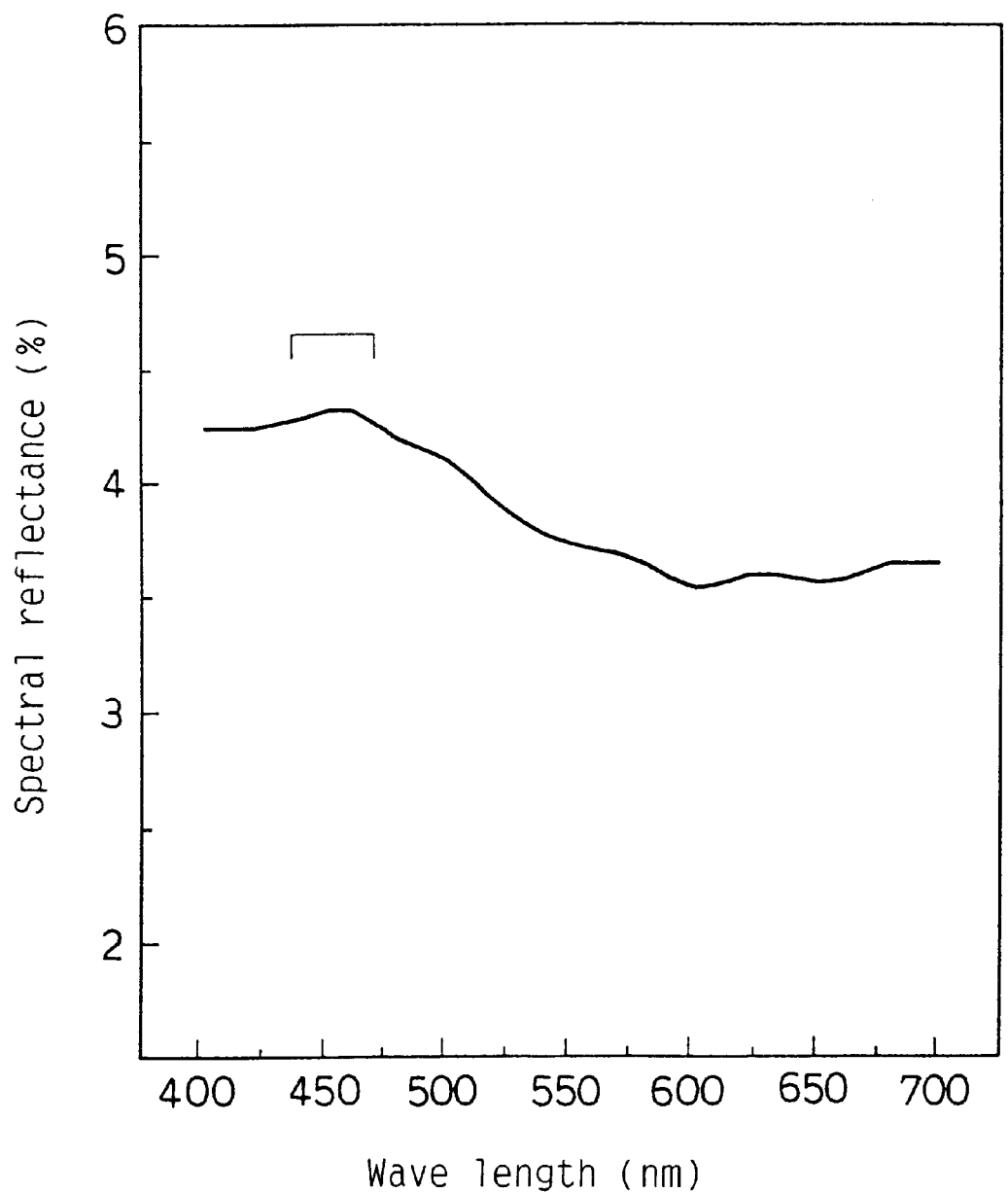
FIG. 13 is a graph showing a reflection spectrum of γ-cobalt oxyhydroxide (higher cobalt oxide x) measured by a spectral calorimeter.

9.2. Analysis of various cobalt oxides and consideration based on the analysis (1) $\gamma$-cobalt oxyhydroxide oxidized in the presence of KOH: The preparation method is as described in Example 1 and the X-ray diffraction diagram is shown in FIG. 1. The oxidized $\gamma$-cobalt oxyhydroxide has an indigo metallic luster and the reflection spectrum obtained by using a spectral calorimeter is shown in FIG. 13. In the same manner as in Example 1, $\gamma$-cobalt oxyhydroxide (K type) is referred to as the cobalt oxide x.

Figure 14:
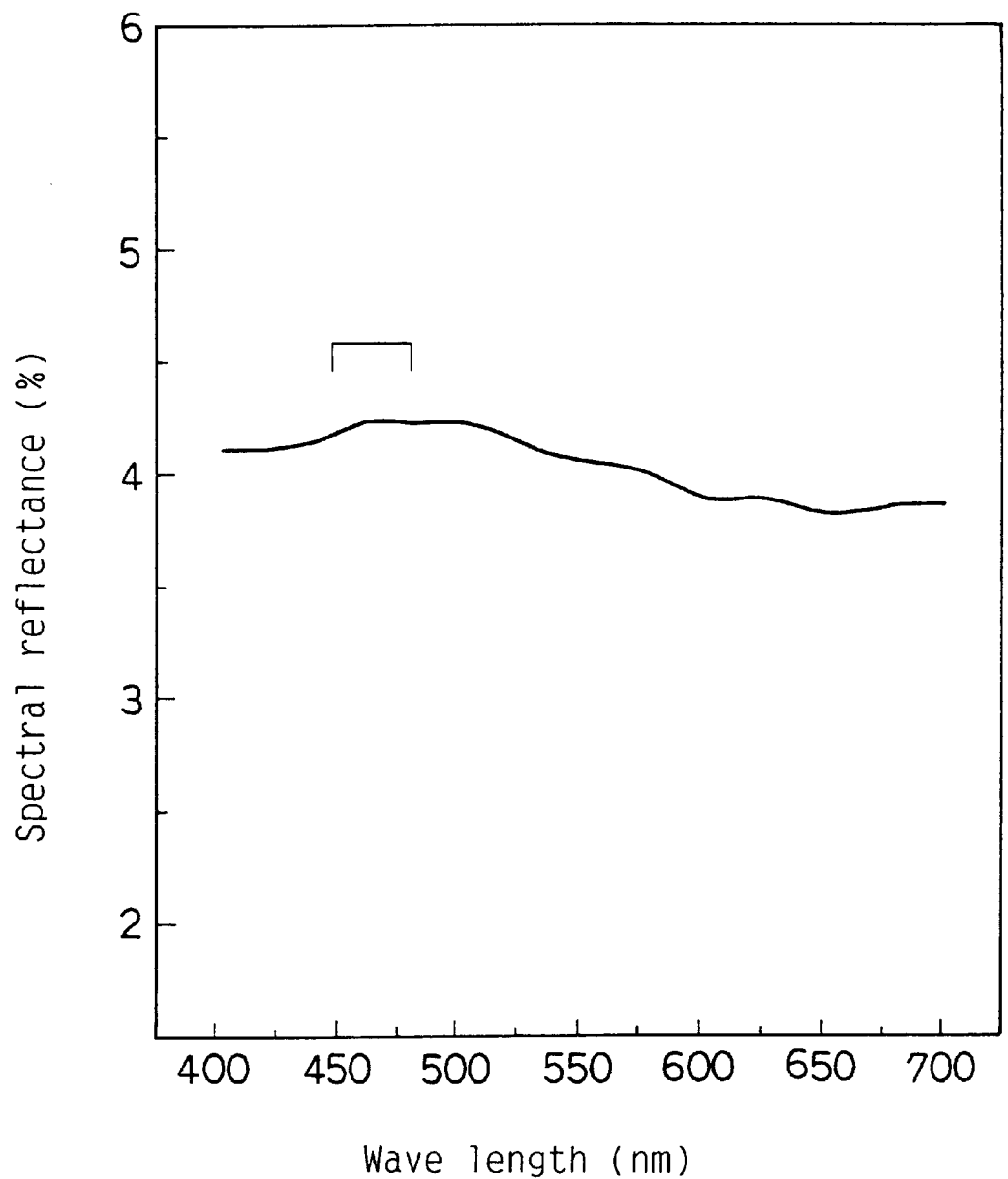
FIG. 14 is a graph showing a reflection spectrum of Na type γ-cobalt oxyhydroxide (higher cobalt oxide y) measured by a spectral colorimeter.

(2) $\gamma$-cobalt oxyhydroxide oxidized in the presence of NaOH: The preparation method is as described in Example 1 and the X-ray diffraction diagram is shown in FIG. 7. The oxidized $\gamma$-cobalt oxyhydroxide has an indigo metallic luster and the reflection spectrum obtained by using a spectral calorimeter is shown in FIG. 14. In the same manner as in Example 1, $\gamma$-cobalt oxyhydroxide (Na-type) is referred to as the cobalt oxide y.

(3) CoO(OH)

Figure 15:
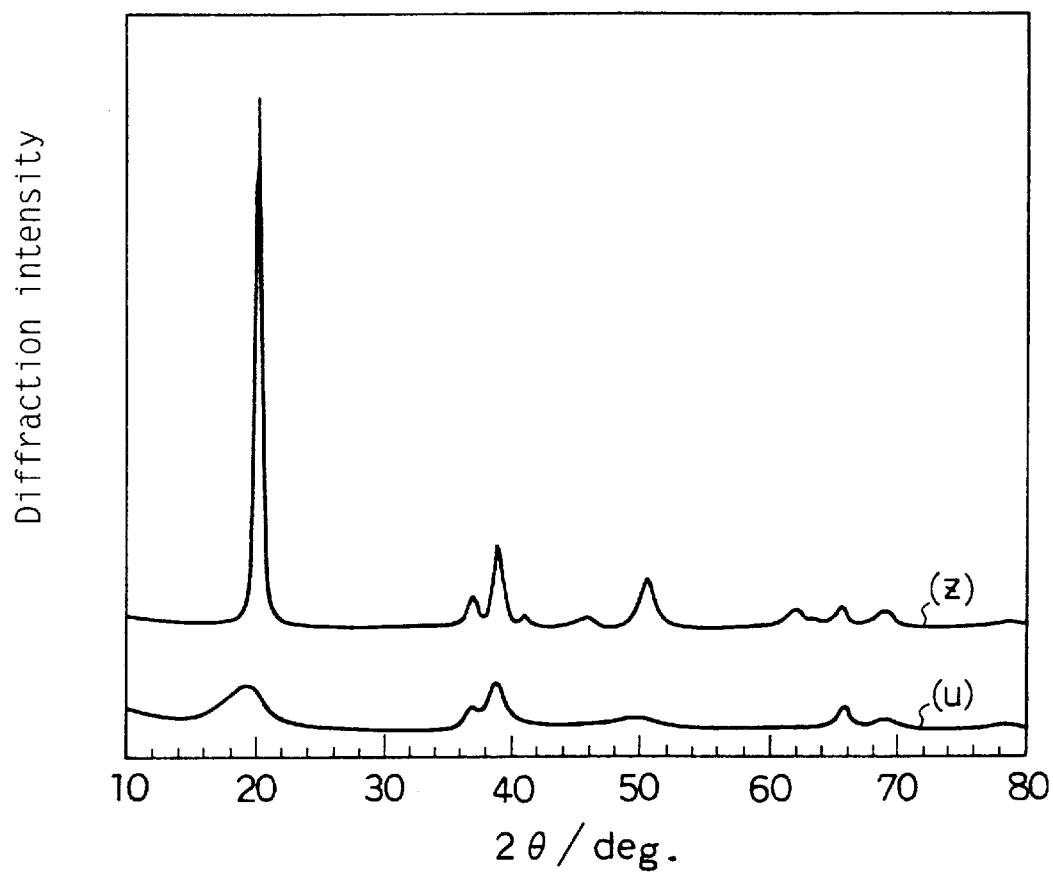
FIG. 15 is a graph showing an X-ray diffraction pattern of CoO(OH) prepared in Example 2 of the present invention.
Figure 16:
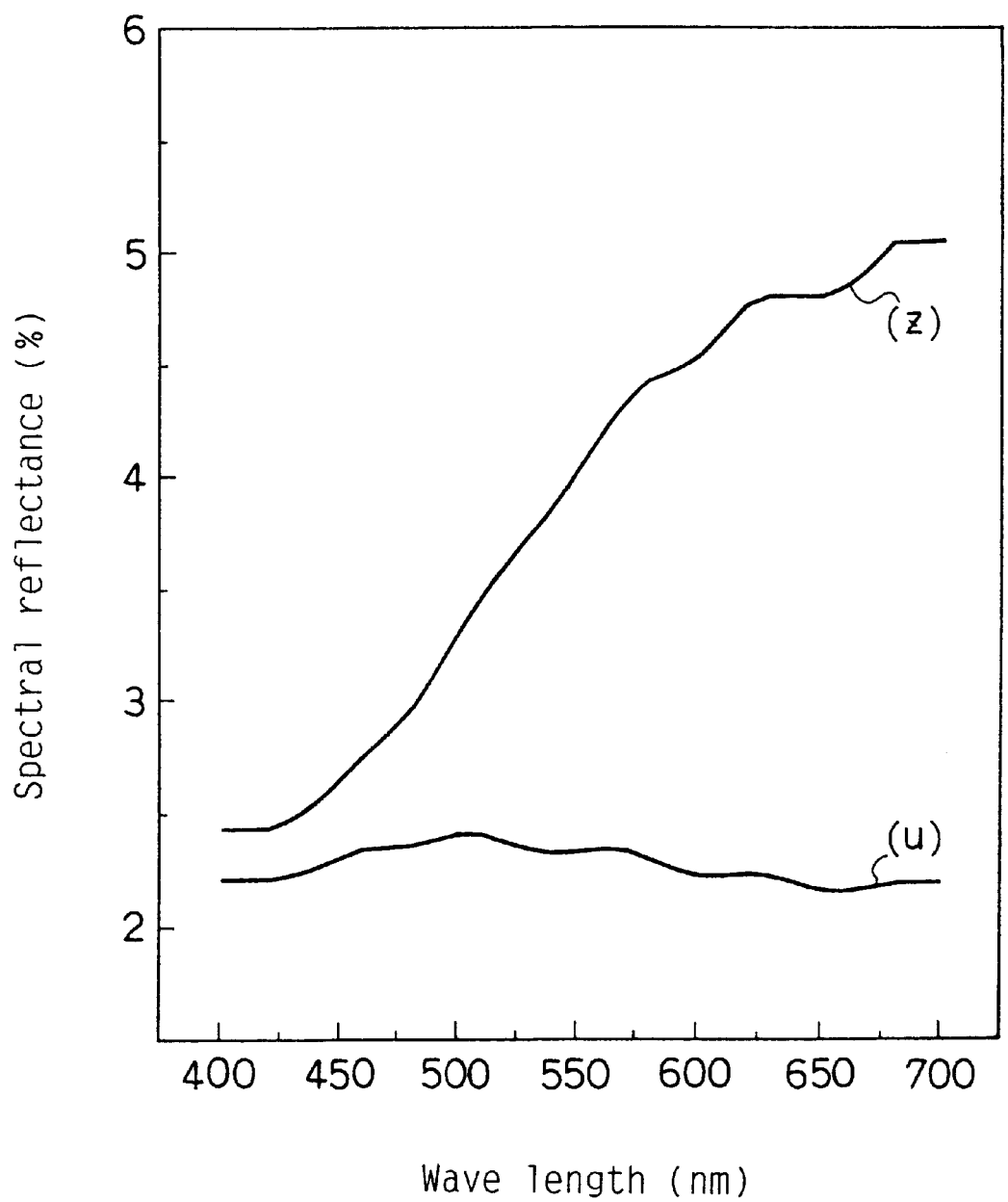
FIG. 16 is a graph showing a reflection spectrum of CoO(OH) measured by a spectral calorimeter.

(3-1) Those having high crystallinity, i.e. $CoHO_2$: Oxide obtained by impregnating a cobalt hydroxide with an aqueous sodium hydroxide solution (3% by weight), followed by a heat treatment at 80° C. for 15 hours. This oxide is referred to as the cobalt oxide z hereinafter. The X-ray diffraction diagram obtained by measuring after treatment and further washing/drying is shown at the upper portion of FIG. 15. The visually observed color of the oxide z is brown and the reflection spectrum obtained by using a spectral calorimeter is shown in FIG. 16. It was confirmed by the measurement according to the titration method described in Example 1 that the cobalt valence is 2.98.

(3-2) Those having low crystallinity, i.e. $\beta$-CoOOH: Oxide obtained by impregnating a cobalt hydroxide with an aqueous sodium hydroxide solution (25% by weight), followed by a heat treatment at 80° C. for 6 hours. This oxide is referred to as the cobalt oxide "u" hereinafter. The X-ray diffraction diagram obtained by measuring after treatment and further washing/drying is shown at the lower portion of FIG. 15. Only a diffraction peak of the (003) plane, which should be present at about 20 degrees (4.4 angstroms), shifted slightly and, therefore, the peak is observed at about 19 degrees (4.6 angstroms), but a basic diffraction pattern is the same as that of the oxide z. The reason of this shift is not clear at present. The visually observed color of the oxide "u" is black and the reflection spectrum obtained by using a spectral calorimeter is shown in FIG. 16. It was confirmed by the measurement according to the titration method described in Example 1 that the cobalt valence is 2.91.

Figure 17:
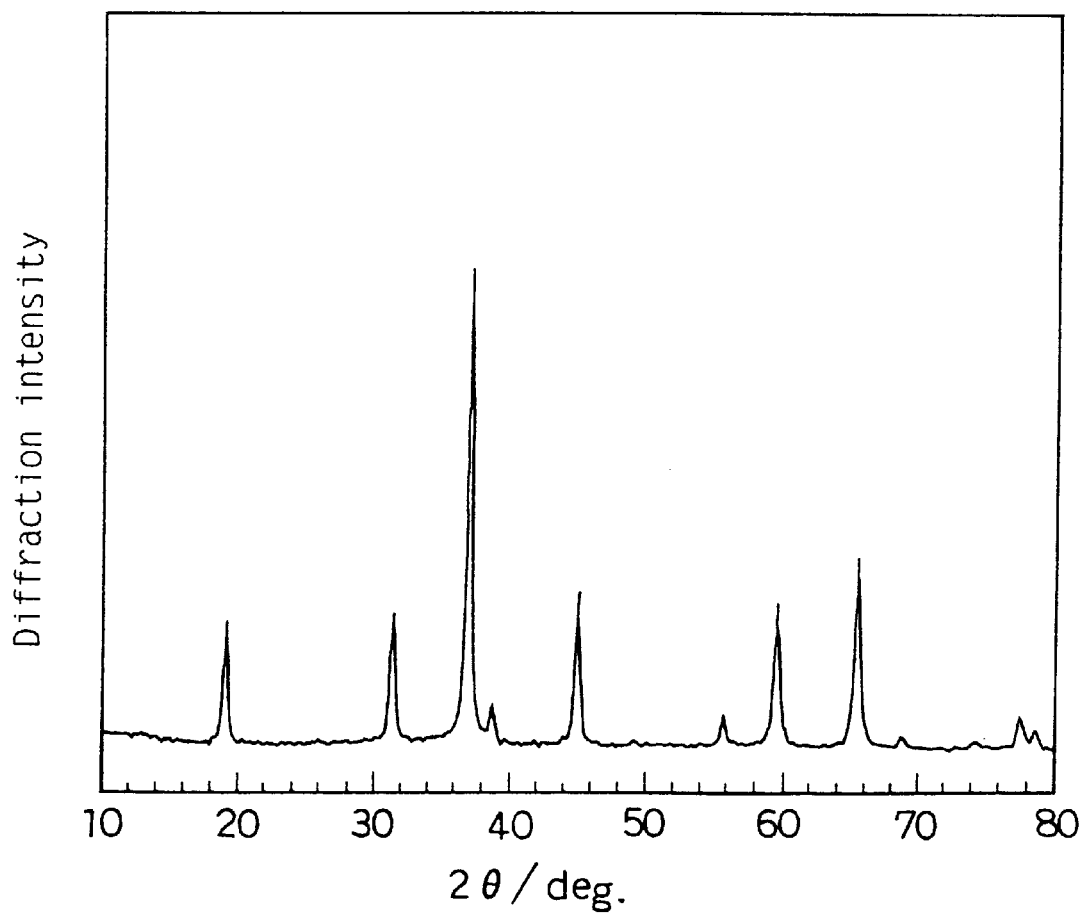
FIG. 17 is a graph showing an X-ray diffraction pattern of $Co_3O_4$ prepared in Example 2.
Figure 18:
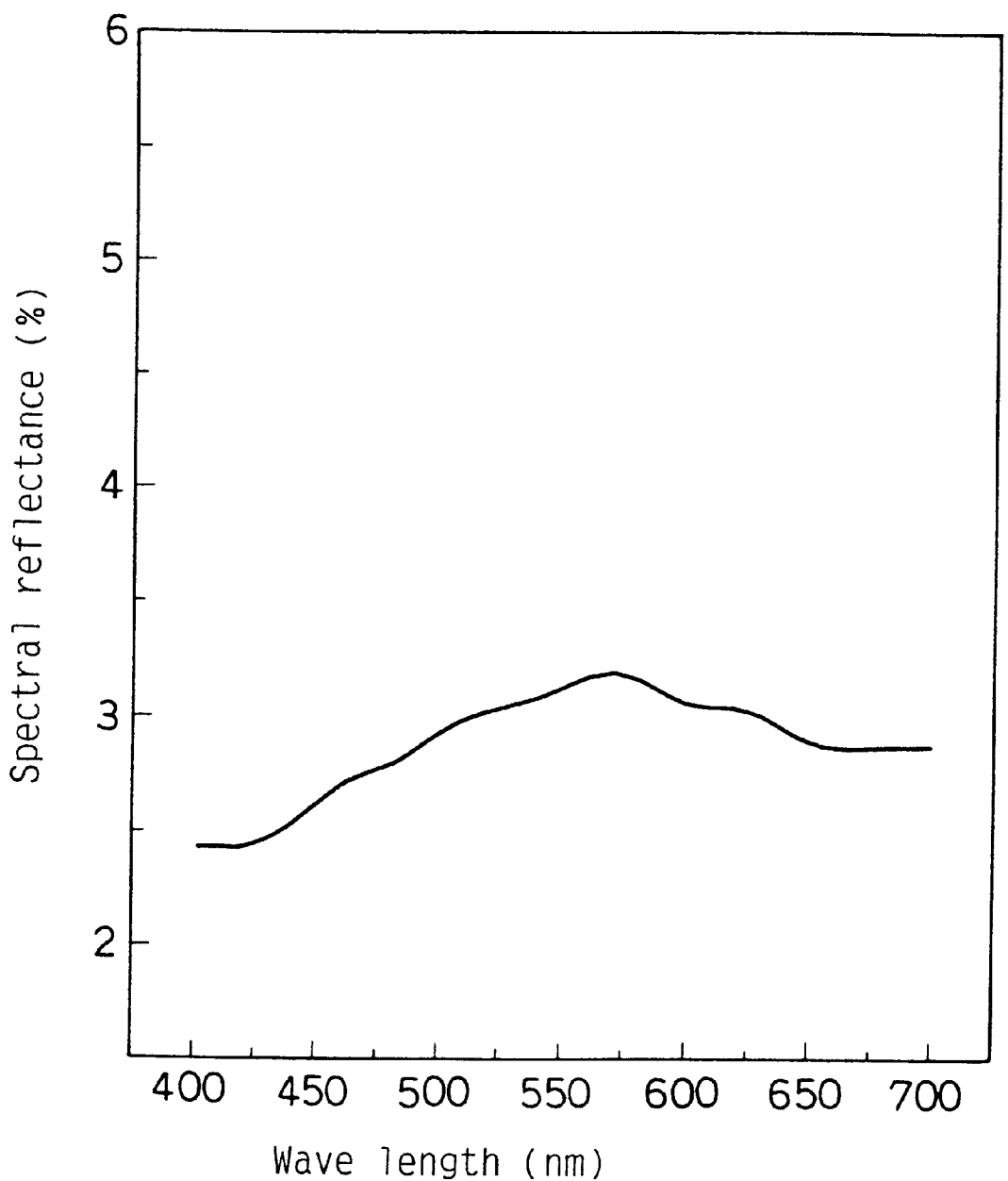
FIG. 18 is a graph showing a reflection spectrum of $Co_3O_4$ measured by a spectral calorimeter.

(4) $Co_3O_4$: Oxide obtained by impregnating a cobalt hydroxide with an aqueous sodium hydroxide solution (30% by weight), followed by a heat treatment at 100° C. for 6 hours. This oxide is referred to as the cobalt oxide "v" hereinafter. The X-ray diffraction diagram obtained by measuring after treatment and further washing/drying is shown in FIG. 17. The crystallinity is considerably low compared with a reagent which is commercially available as $Co_3O_4$. The visually observed color of the oxide "v" is black and the reflection spectrum obtained by using a spectral calorimeter is shown in FIG. 18. It was confirmed by the measurement according to the titration method described in Example 1 that the cobalt valence is 2.62. It was also confirmed that almost the same one can be obtained even if potassium hydroxide is used in place of the sodium hydroxide.

The above five cobalt oxides were formed into pellets and the electric conductivity was measured by the D.C. four-terminal method. As a result, a value of the electric conductivity of the cobalt oxide x is almost the same as that of the cobalt oxide y, and the order of the magnitude of the electric conductivity of the cobalt oxides x, y, z, u and v is as follows: x, y>u>v>z. Namely, $\gamma$-cobalt oxyhydroxide (oxides x, y) has high conductivity compared with others. This reason is considered as follows. That is, the cobalt valence reached higher than 3.0 and the electronic conductivity appeared in the cobalt oxide.

Figure 19:
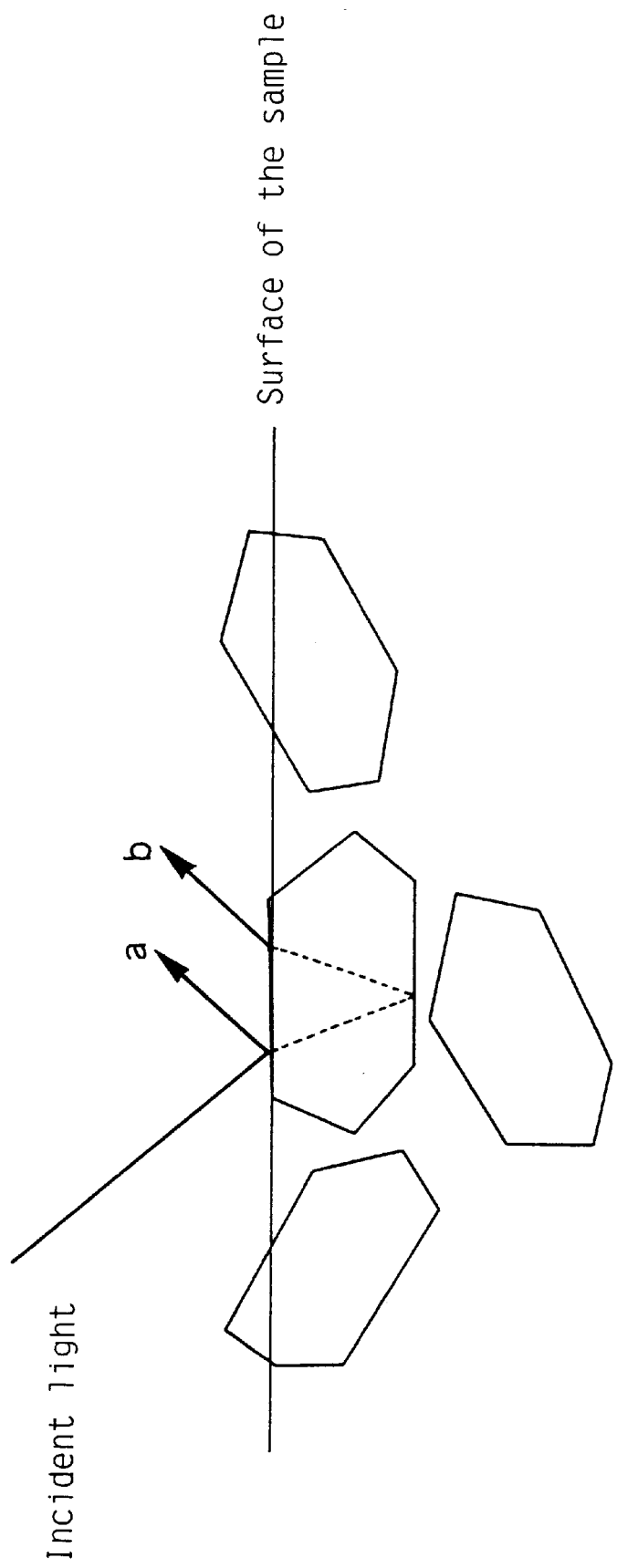
FIG. 19 is a schematic diagram showing a principle of the diffuse reflection method.

Next, the reflection spectrum of $\gamma$-cobalt oxyhydroxide measured by a spectral colorimeter: FIG. 13, FIG. 14 (color of indigo metallic luster) will be considered. Since these spectrums are basically based on diffuse reflection of the powder, a combination of light "a" reflected on the crystal surface and light "b" transmitted through the crystal is measured, its principle being schematically shown in FIG. 19. In a transition metal compound having an absorption band with large absorbance at the visible region, it is known that light of the absorption band is strongly selected and reflected (namely, reflected light "a" becomes close to the absorption spectrum of the compound) by the diffuse reflection method and this light is observed. As a typical example, if potassium permanganate ($KMnO_4$) having a strong absorption band due to charge-transfer transition at a green region (530 nm) is in the form of an aqueous solution, transmitted light can be seen and, therefore, $KMnO_4$ appears to be reddish violet (complementary color of green). In case of a fine crystal, light at the green region as the absorption band is strongly selected and reflected and, therefore, it appears to be green with luster. Thus, a maximum reflectance of the diffuse reflection spectrum arises at this green region.

In J. Electrochem. Soc., 136 (1989) 613–619, D. A. Corrigan et al. discloses a reading that γ-nickel oxyhydroxide has a strong absorption band at a wavelength of 450 nm (indigo) and is attributed to charge-transfer transition between metal and oxygen, and also has a relation to the presence of tetravalent nickel species in γ-nickel oxyhydroxide. Accordingly, if the spectrum measurement according to the diffuse reflection method is conducted with respect to γ-nickel oxyhydroxide, a peak of the reflectance appears at a wavelength of 450 nm based on the above principle, which can be an evidence showing the presence of the tetravalent nickel species.

On the basis of the above consideration, the present inventors considered that γ-cobalt oxyhydroxide has an absorption band based on the charge-transfer transition between metal and oxygen is present at about 450 nm like γ-nickel oxyhydroxide, although the details cannot be elucidated at present. Since this absorption band has large absorbance, corresponding light at about 450 nm is strongly selected and reflected by the diffuse reflection method and, therefore, a color of indigo metallic luster is provided to the oxide. This color is quantitatively represented as a maximum reflection marked in FIG. 13 and FIG. 14. Furthermore, in the manner of the above interpretation of D. A. Corrigan et al., it can be said that these results reflect the presence of tetravalent cobalt species which are present in γ-cobalt oxyhydroxide.

By combining a resemblance in maximum position of the reflectance between the reflection spectrum of the active material particles (A, B in FIG. 12) and the reflection spectrum of γ-cobalt oxyhydroxide (FIG. 13 and FIG. 14) with the measurement results that these materials have extremely high electronic conductivity, it is considered that the cobalt oxide constituting the coating layer of the active material particles A, B of the present invention comprises γ-cobalt oxyhydroxide as a main component. It is also assumed by the same consideration that the cobalt oxide constituting the coating layer of the active material particles C, D of the above Comparative Examples is an oxide having a valence of 3.0 or less corresponding to the above oxides z, u, v.

It is considered that the difference in oxidation state of the cobalt oxide constituting the coating layer arises due to the difference in oxidation treatment method. As described above, in the oxidation reaction of the coating layer of the $Co(OH)_2$-coated nickel hydroxide particles, two reaction processes are assumed. In any process, the proceeding degree of the oxidation varies largely with the state of water and oxygen (air) in the system. In order to enhance the proceeding degree of the oxidation, it is important to dry the particles, which become funicular by having an aqueous alkaline solution on the surface, over a certain time under high-temperature/high-humidity atmosphere.

In the production method (method using a batch fluidized drier) of the Comparative Example, a large amount of hot air must be voluntarily fed so as to fluidize the particles. Since the particles are fluidized, the area of the particles wetted with the aqueous alkaline solution in contact with air becomes larger and, therefore, the aqueous alkaline solution is rapidly evaporated from the surface of the particles. Namely, the aqueous alkaline solution on the surface of the particles is liable to be evaporated before the reaction of the process 1 or process 2 proceeds sufficiently. Accordingly, formation of particle agglomerates and adhesion of the particles onto the inner wall of the device caused by the treatment are easily inhibited, but it becomes difficult to completely oxidize the cobalt hydroxide of the coating layer to the higher state.

From the above point of view, since microwave is used as heating means in the present invention, the aqueous alkaline solution rapidly reaches high temperature and, therefore, it is possible to produce the high-temperature/high-humidity atmosphere with a sufficient amount of oxygen, which is suitable for the proceeding of the processes 1 and 2. By controlling such an atmosphere in the form described above, the cobalt hydroxide coating layer is completely oxidized, thereby to reach γ-cobalt oxyhydroxide having a cobalt valence of higher than 3.0.

As described above, according to the present invention, the coating layer of the $Co(OH)_2$-coated nickel hydroxide particles can be efficiently converted into γ-cobalt oxyhydroxide.

9.3. Analysis of active material particles (2)

Then, the active material particles A, B of the present invention were dissolved in an acid and an amount of an alkali metal (potassium or sodium) contained in the active material was measured by the ICP emission spectral analysis. It was confirmed by observing the cross section of the active material particles using an electron probe microanalyzer (EPMA) that the alkali metal is present only at the coating layer and is not present in the interior mother particles in the active material particles A, B. The measurement value obtained by the ICP emission spectral analysis reflects the amount of the alkali metal contained in the cobalt oxide constituting the coating layer. Based on this respect, the amount of the alkali metal contained in the cobalt oxide constituting the coating layer of the active material particles A, B was estimated. As a result, it was about 0.27 in molar ratio to cobalt. These analysis results are not contradictory to the above assumption that the cobalt oxide constituting the coating layer of the active material particles A, B comprises γ-cobalt oxyhydroxide as a main component.

Next, in order to understand the electrochemical behavior of the active material particles of the present invention, a porous foamed nickel substrate (1 cm×1 cm) welded with a lead wire was filled with active material particles A,C, respectively, and then pressed to produce a test electrode. Thereafter, the measurement of cyclic voltammetry was conducted under the following conditions.

Electrolyte: prepared by dissolving 40 g/l of $LiOH.H_2O$ in an aqueous KOH solution having a concentration of 31% by weight (specific gravity at 20° C.: 1.31).

Counter electrode: hydrogen storage alloy negative electrode (sufficiently activated by repeating charge/discharge in combination with another nickel hydroxide electrode)

Reference electrode: Hg/HgO electrode

Sweep condition: After sweeping within a range from a rest potential to +600 mV, it was carried out at a sweep rate of 3 mV/sec. within a range from +600 mV (oxidation side) and −800 mV (reduction side).

Ambient temperature: 20° C.

Figure 20:
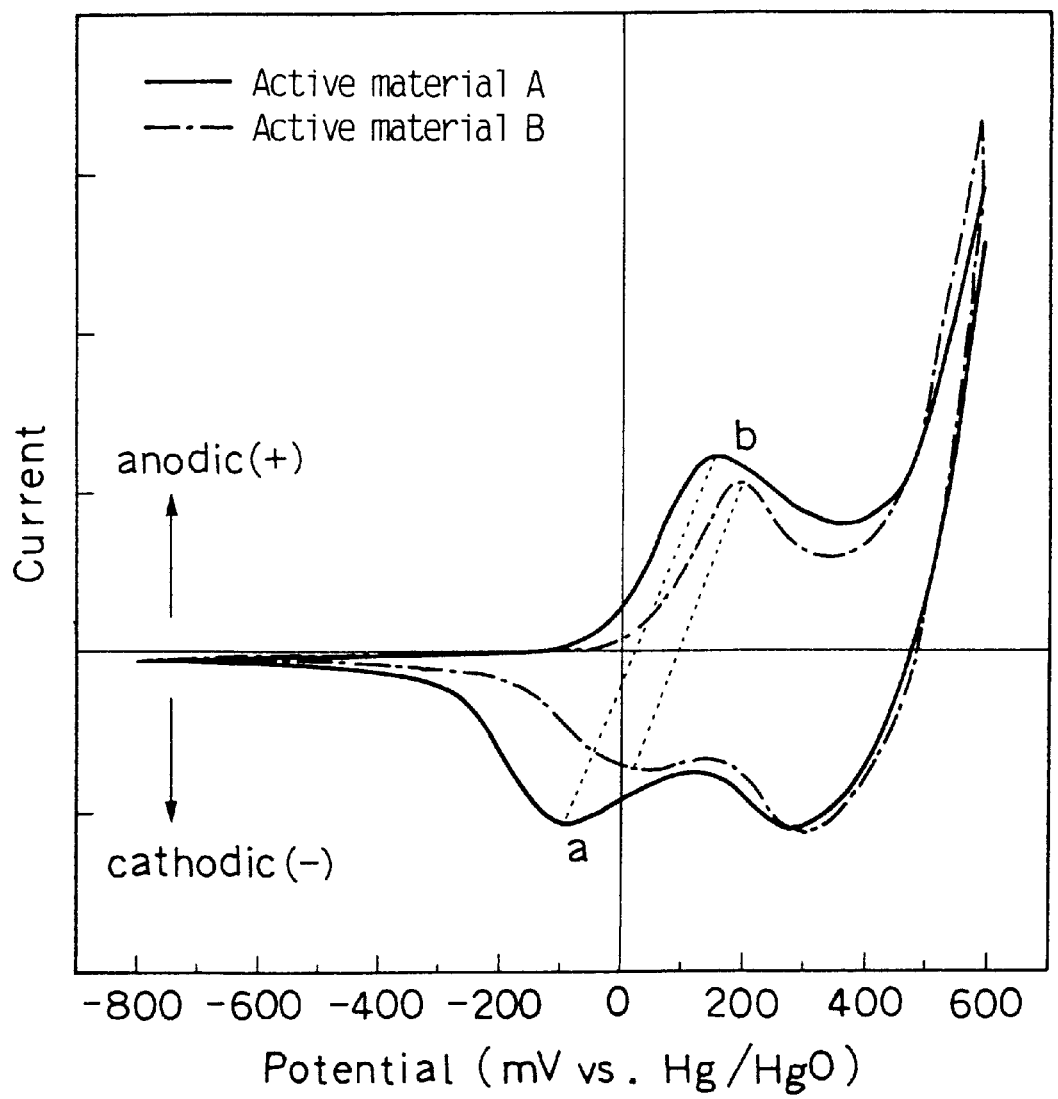
FIG. 20 is a graph showing a current-voltage curve obtained by cyclic volutammetry of active material particles A and C of Example 2.

The results with respect to two active material particles are shown in FIG. 20. A sharp anodic current peak at a potential which is more noble than +400 mV corresponds to charge (with evolution of oxygen) of the nickel oxide as mother particles, and a cathodic current peak at about +300 mV corresponds to discharge of the nickel hydroxide. Therefore, peaks marked with the symbols "a", "b" correspond to redox peaks of the cobalt oxide of the coating layer, respectively. As is apparent from FIG. 20, in the cobalt oxide of the active material particles A of the present invention, a charge/discharge potential shifts to a noble direction by about 50 to 100 mA compared with the active material particles C of the Comparative Example. The same test was performed with respect to the active material particles B. As a result, it was confirmed that the same results as those in the active material particles A were obtained. These behaviors are the same as those of FIG. 6 and FIG. 8 shown in Example 1. In this respect, it is strongly supported that the cobalt oxide constituting the coating layer of the active material particles A, B comprises γ-cobalt oxyhydroxide as the main component.

10. Relation between physical properties of active material particles of the present invention and positive electrode characteristics.

As described above, the cobalt oxide constituting the coating layer of the active material particles of the present invention comprises γ-cobalt oxyhydroxide as the main component. Since the cobalt valence reaches higher than 3.0 and the electronic conductivity appears, γ-cobalt oxyhydroxide has conductivity higher than that of the oxide such as β-cobalt oxyhydroxide, etc. Therefore, the utilization of the non-sintered positive electrode for alkaline storage batteries using the active material particles A, B of the present invention is higher than the utilization of those using the active material particles C, D of the Comparative Example. The reason why the utilization of the positive electrode using the active material particles A, B is higher than that of the positive electrode using the oxides x, y of Example 1 is considered to be as follows. That is, since starting materials of the active material particles A, B are Co(OH)$_2$-coated nickel hydroxide particles, the following effects (1), (2) appear.

(1) Since the dispersibility of the cobalt oxide as the conductive agent is high, the current collection from a lot of nickel hydroxide particles at the position apart from the substrate skeleton in the positive electrode is satisfactorily performed.

(2) Since the interface between the coating layer and the nickel hydroxide particles as mother particles is bonded on oxidation treatment, the current collection from the respective mother particles is easily performed.

Since γ-cobalt oxyhydroxide constituting the coating layer of the active material particles A, B has high conductivity, the current collection from a lot of nickel hydroxides is also performed during storage under short circuit. Furthermore, since γ-cobalt oxyhydroxide itself has been oxidized to the state where the valence exceeds 3.0 and, at the same time, the charge/discharge potential has shifted to the base direction by about 50 to 100 mV compared with a conventional cobalt oxide, γ-cobalt oxyhydroxide is not easily reduced to the state that the valence is 2.0 (state where it dissolves in electrolyte). Therefore, it is possible to inhibit the destruction of the conductive network caused by intensive proceeding of the reduction in the vicinity of the substrate skeleton during storage under short circuit. Thus, in the non-sintered positive electrode for alkaline storage batteries using the active material particles A, B as the conductive agent, there can be provided extremely high capacity recovery after storage under short circuit compared with a conventional positive electrode.

As described above, it is possible to find a clear relation between the characteristics of the non-sintered positive electrode for alkaline storage batteries shown in 8, and the physical properties of the active material particles A, B shown in 9.

In Japanese Laid-Open Patent Hei 8-148145, there is some description with respect to the pore distribution of the active material particles. In order to make the relation with the active material particles of the present invention clear, the results of the pore distribution of the active material particles A to D used in the above Examples, measured by the BET method, are shown in Table 5.

TABLE 5

| Active material | Preparing conditions | Proportion of space of pores having a diameter of not less than 60 angstroms |
|---|---|---|
| A | Oxidation in the presence of aq. KOH of Example | 18.5% |
| B | Oxidation in the presence of aq. NaOH of Example | 17.9% |
| C | Oxidation in the presence of aq. KOH of Comparative Example | 22.5% |
| D | Oxidation in the presence of aq. KOH of Comparative Example | 19.7% |

In the previously described patent publication, there is the following description, "it is important for improvement of the utilization that not less than 20% of the total space volume of all pores in the active material particles is occupied by pores having a diameter of not less than 60 angstroms". As is apparent from Table 5, the active material particles A, B do not basically correspond to the above description. However, even if a sample whose pore distribution corresponds to the above description is artificially prepared (this sample can be prepared by changing the synthesis conditions of Co(OH)$_2$-coated nickel hydroxide particles or the following oxidation treatment conditions), a remarkable improvement in utilization is not recognized. Consequently, the present inventors can consider that there is no relation between the pore distribution of the active material particles and the utilization as described in the previously described patent publication.

In the above Example, in preparing the Co(OH)$_2$ coated nickel hydroxide particles, the coating layer was formed by the liquid phase method, but the coating conditions in that case are not limited to those described in the above Example. It is also possible to prepare the active material particles of the present invention by a method of mixing nickel hydroxide particles with a cobalt hydroxide powder and coating the surface of the particles with cobalt hydroxide utilizing a shear force or an impact force at the time of mechanical mixing (mechanical mixing method).

As described above, according to the present invention, there can be provided an alkaline storage battery capable of maintaining high capacity even after standing in the state of overdischarge or short circuit, long-term storage, or high-temperature storage while accomplishing high positive electrode utilization, because γ-cobalt oxyhydroxide has high valence and high conductivity.

The entire disclosure of Japanese Patent Application No. Hei 9-272341 filed on Oct. 6, 1997 including specification, claims, drawings and summary is incorporated herein by reference in its entirety.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A positive electrode material for alkaline storage batteries, comprising:
   a cobalt oxide comprising γ-cobalt oxyhydroxide, which belongs to any one crystal system of hexagonal, orthorhombic and monoclinic systems and has a layered structure, wherein a lattice spacing of the (003) plane is from 5.5 to 7.0 angstroms and an average valence of cobalt is higher than 3.0; and
   nickel hydroxide particles.

2. The positive electrode material for alkaline storage batteries in accordance with claim 1, wherein said γ-cobalt oxyhydroxide further contains $K^+$ or $Na^-$ in the crystal.

3. The positive electrode material for alkaline storage batteries in accordance with claim 2, wherein an atomic ratio of $K^+$ or $Na^+$ in said γ-cobalt oxyhydroxide to cobalt is from 0.20 to 0.33.

4. The positive electrode material for alkaline storage batteries in accordance with claim 2, wherein a weight ratio of said cobalt oxide to said nickel hydroxide particles is from 0.02 to 0.10.

5. An alkaline storage battery comprising a positive electrode containing the active material of claim 1, a negative electrode, a separator, and an alkaline electrolyte.

6. A positive electrode material for alkaline storage batteries, comprising:
   nickel hydroxide particles; and layers of a cobalt oxide coating surfaces of said nickel hydroxide particles; said cobalt oxide comprising γ-cobalt oxyhydroxide, which belongs to any one crystal system of hexagonal, orthorhombic and monoclinic systems and has a layered structure, wherein a lattice spacing of the (003) plane is from 5.5 to 7.0 angstroms and an average valence of cobalt is higher than 3.0.

7. The positive electrode material for alkaline storage batteries in accordance with claim 6, wherein said nickel hydroxide particles have an average particle diameter of 5 to 20 μm, and said layers have a thickness of not more than 0.2 μm.

8. An alkaline storage battery comprising a positive electrode containing the active material of claim 6, a negative electrode, a separator, and an alkaline electrolyte.

9. A positive electrode material for alkaline storage batteries, comprising:
   a cobalt oxide comprising γ-cobalt oxyhydroxide, which belongs to any one crystal system of hexagonal, orthorhombic and monoclinic systems and contains $K^+$ or $Na^+$ in the crystal, and which has a layered structure, wherein a lattice spacing of the (003) plane is from 5.5 to 7.0 angstroms and an average valence of cobalt is higher than 3.0; and
   nickel hydroxide particles.

10. The positive electrode material for alkaline storage batteries in accordance with claim 9, wherein an atomic ratio of $K^+$ or $Na^+$ in said γ-cobalt oxyhydroxide to cobalt is from 0.20 to 0.33.

11. The positive electrode material for alkaline storage batteries in accordance with claim 9, wherein a weight ratio of said cobalt oxide to said nickel hydroxide particles is from 0.02 to 0.10.

12. An alkaline storage battery comprising a positive electrode, a negative electrode, a separator, and an alkaline electrolyte, wherein said positive electrode comprising:
   a cobalt oxide comprising γ-cobalt oxyhydroxide, which belongs to any one crystal system of hexagonal, orthorhombic and monoclinic systems and has a layered structure, wherein a lattice spacing of the (003) plane is from 5.5 to 7.0 angstroms and an average valence of cobalt is higher than 3.0; and
   nickel hydroxide particles.

13. An alkaline storage battery comprising a positive electrode, a negative electrode, a separator, and an alkaline electrolyte, wherein said positive electrode comprising:
   a cobalt oxide comprising γ-cobalt oxyhydroxide, which belongs to any one crystal system of hexagonal, orthorhombic and monoclinic systems and contains $K^+$ or $Na^+$ in the crystal, and which has a layered structure, wherein a lattice spacing of the (003) plane is from 5.5 to 7.0 angstroms and an average valence of cobalt is higher than 3.0; and
   nickel hydroxide particles.

14. A method of producing a positive electrode material for alkaline storage batteries, said method comprising:
   a first step of adding dropwise an aqueous alkaline solution while mixing nickel hydroxide particles having a coating layer of cobalt hydroxide in a container equipped with microwave heating means and mixing and stirring means, thereby to form wet particles whose surface is wetted with said aqueous alkaline solution;
   a second step of mixing continuously while heating said wet particles by microwave irradiation in the airtight container to heat said wet particles to a predetermined temperature; and
   a third step of releasing the airtight state of the container to introduce air into the container after reaching the predetermined temperature and mixing continuously while controlling an output of the microwave so that a temperature of said particles becomes constant, thereby to completely dry said wet particles.

15. The method of producing a positive electrode material for alkaline storage batteries in accordance with claim 14, wherein the inner wall portion of the container is provided with heating means and the inner wall of the container is heated supplementally with the heating means from the first step through the third step.

16. The method for producing a positive electrode material for alkaline storage batteries in accordance with claim 14, wherein said nickel hydroxide particles having the coating layer of the cobalt oxide have an average particle diameter of 5 to 20 μm and a BET specific surface area of 5 to 12 $m^2/g$, and the coating layer has a thickness of not more than 0.2 μm.

17. The method of producing a positive electrode material for alkaline storage batteries in accordance with claim 14, wherein the heating temperature in the second and third steps is from 90 to 130° C.

18. The method of producing a positive electrode material for alkaline storage batteries in accordance with claim 14, wherein the aqueous alkaline solution is an aqueous solution of KOH or NaOH, a concentration of said aqueous solution is larger than 40% by weight, and an amount of said aqueous solution added dropwise is controlled so that a weight ratio of an alkaline solute to the dry weight of the nickel hydroxide particles having the coating layer of cobalt hydroxide is from 0.04 to 0.06.

* * * * *